US012367884B2

(12) United States Patent
Kamiya et al.

(10) Patent No.: US 12,367,884 B2
(45) Date of Patent: Jul. 22, 2025

(54) ENCODING DEVICE, DECODING DEVICE, ENCODING METHOD, AND DECODING METHOD

(71) Applicant: Panasonic Intellectual Property Corporation of America, Torrance, CA (US)

(72) Inventors: Yuichi Kamiya, Ishikawa (JP); Takuya Kawashima, Ishikawa (JP); Akira Harada, Kanagawa (JP); Hiroyuki Ehara, Kanagawa (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 231 days.

(21) Appl. No.: 18/276,752

(22) PCT Filed: Oct. 15, 2021

(86) PCT No.: PCT/JP2021/038185
§ 371 (c)(1),
(2) Date: Aug. 10, 2023

(87) PCT Pub. No.: WO2022/176270
PCT Pub. Date: Aug. 25, 2022

(65) Prior Publication Data

US 2024/0127830 A1 Apr. 18, 2024

Related U.S. Application Data

(60) Provisional application No. 63/149,933, filed on Feb. 16, 2021.

(30) Foreign Application Priority Data

Aug. 30, 2021 (JP) ................................ 2021-139976

(51) Int. Cl.
*G10L 19/00* (2013.01)
*G10L 19/008* (2013.01)

(52) U.S. Cl.
CPC ................................ *G10L 19/008* (2013.01)

(58) Field of Classification Search
USPC ........................................................ 704/500
See application file for complete search history.

(56) References Cited

U.S. PATENT DOCUMENTS 6,580,754 B1 6/2003 Wan et al.
2012/0002818 A1 1/2012 Heiko et al.
(Continued)

FOREIGN PATENT DOCUMENTS

JP 2012-521012 9/2012
WO 01/47283 6/2001

OTHER PUBLICATIONS

International Search Report (ISR) from International Searching Authority (Japan Patent Office) in International Pat. Appl. No. PCT/JP2021/038185, dated Dec. 28, 2021, together with an English language translation.
(Continued)

*Primary Examiner* — Satwant K Singh
(74) *Attorney, Agent, or Firm* — Greenblum & Bernstein, P.L.C.

(57) ABSTRACT

This encoding device comprises: a downmix circuit that switches mixing processing according to the characteristic of an input stereo signal to generate either a first stereo signal or a second stereo signal obtained by mixing processing of a left channel signal and a right channel signal; a first encoding circuit that encodes the first stereo signal; and a second encoding circuit that encodes two signals included in the second stereo signal. The second encoding circuit performs monaural encoding on the basis of the encoding
(Continued)

1 mode of the first encoding circuit in a first section in which switching from the first stereo signal to the second stereo signal is performed and/or a second section in which switching from the second stereo signal to the first stereo signal is performed.

15 Claims, 15 Drawing Sheets

(56) References Cited

U.S. PATENT DOCUMENTS

| | | | | |
|---|---|---|---|---|
| 2015/0235646 | A1* | 8/2015 | Miyasaka | G10L 19/24<br>381/23 |
| 2017/0365263 | A1* | 12/2017 | Disch | G10L 19/13 |
| 2020/0176000 | A1* | 6/2020 | Li | G10L 19/20 |
| 2023/0051420 | A1* | 2/2023 | Eksler | G10L 19/008 |
| 2023/0178086 | A1* | 6/2023 | Moriya | G10L 19/022<br>704/500 |
| 2023/0298598 | A1* | 9/2023 | Moriya | G10L 19/008<br>704/500 |

OTHER PUBLICATIONS

"Codec for Enhanced Voice Services (EVS); Detailed Algorithmic Description (Release 16)", 3GPP TS 26.445 V16.0.0, Jun. 2019.

* cited by examiner

| | Embedded | Simulcast2 | Simulcast1 | Simulcast2 | Embedded | Embedded |
|---|---|---|---|---|---|---|
| Down-mixing | $\begin{pmatrix}X_n\\Y_n\end{pmatrix}=D\begin{pmatrix}L_n\\R_n\end{pmatrix}$, $D=\begin{pmatrix}0.5 & 0.5\\-0.5 & 0.5\end{pmatrix}$ | $\begin{pmatrix}X_n\\Y_n\end{pmatrix}=D\begin{pmatrix}L_n\\R_n\end{pmatrix}$, $D=\frac{1}{2}\begin{pmatrix}1+\alpha_n & 1-\alpha_n\\-1+\alpha_n & 1+\alpha_n\end{pmatrix}$, $\alpha_n=\frac{n}{N}, n=0,\cdots,N-1$ | $\begin{pmatrix}X_n\\Y_n\end{pmatrix}=D\begin{pmatrix}L_n\\R_n\end{pmatrix}$, $D=\begin{pmatrix}1 & 0\\0 & 1\end{pmatrix}$ | $\begin{pmatrix}X_n\\Y_n\end{pmatrix}=D\begin{pmatrix}L_n\\R_n\end{pmatrix}$, $D=\frac{1}{2}\begin{pmatrix}2-\alpha_n & \alpha_n\\-\alpha_n & 2-\alpha_n\end{pmatrix}$, $\alpha_n=\frac{n}{N}, n=0,\cdots,N-1$ | $\begin{pmatrix}X_n\\Y_n\end{pmatrix}=D\begin{pmatrix}L_n\\R_n\end{pmatrix}$, $D=\begin{pmatrix}0.5 & 0.5\\-0.5 & 0.5\end{pmatrix}$ | $\begin{pmatrix}X_n\\Y_n\end{pmatrix}=D\begin{pmatrix}L_n\\R_n\end{pmatrix}$, $D=\begin{pmatrix}0.5 & 0.5\\-0.5 & 0.5\end{pmatrix}$ |
| Up-mixing | $\begin{pmatrix}L_n\\R_n\end{pmatrix}=U\begin{pmatrix}X_n\\Y_n\end{pmatrix}$, $U=\begin{pmatrix}1 & -1\\1 & 1\end{pmatrix}$ | $\begin{pmatrix}L_n\\R_n\end{pmatrix}=\frac{1}{1+\alpha_n^2}U\begin{pmatrix}X_n\\Y_n\end{pmatrix}$, $U=\begin{pmatrix}1+\alpha_n & -1+\alpha_n\\1-\alpha_n & 1+\alpha_n\end{pmatrix}$, $\alpha_n=\frac{n}{N}, n=0,\cdots,N-1$ | $\begin{pmatrix}L_n\\R_n\end{pmatrix}=U\begin{pmatrix}X_n\\Y_n\end{pmatrix}$, $U=\begin{pmatrix}1 & 0\\0 & 1\end{pmatrix}$ | $\begin{pmatrix}L_n\\R_n\end{pmatrix}=\frac{1}{1-\alpha_n+0.5\alpha_n^2}U\begin{pmatrix}X_n\\Y_n\end{pmatrix}$, $U=\begin{pmatrix}1-\frac{1}{2}\alpha_n & -\frac{1}{2}\alpha_n\\\frac{1}{2}\alpha_n & 1-\frac{1}{2}\alpha_n\end{pmatrix}$, $\alpha_n=\frac{n}{N}, n=0,\cdots,N-1$ | $\begin{pmatrix}L_n\\R_n\end{pmatrix}=U\begin{pmatrix}X_n\\Y_n\end{pmatrix}$, $U=\begin{pmatrix}1 & -1\\1 & 1\end{pmatrix}$ | $\begin{pmatrix}L_n\\R_n\end{pmatrix}=U\begin{pmatrix}X_n\\Y_n\end{pmatrix}$, $U=\begin{pmatrix}1 & -1\\1 & 1\end{pmatrix}$ |
| EVS encoding mode | | 32kbps TCX<br>16.4kbps TCX | | 13.2kbps TCX<br>32kbps TCX<br>16.4kbps TCX | 13.2kbps LR-HQ | |

FIG. 10

| | MS | MS→LR | LR | LR→MS | MS | MS |
|---|---|---|---|---|---|---|
| Down-mixing | $\begin{pmatrix}X_n\\Y_n\end{pmatrix}=D\begin{pmatrix}L_n\\R_n\end{pmatrix}$, $D=\begin{pmatrix}0.5 & 0.5\\-0.5 & 0.5\end{pmatrix}$ | $\begin{pmatrix}X_n\\Y_n\end{pmatrix}=D\begin{pmatrix}L_n\\R_n\end{pmatrix}$, $D=\frac{1}{2}\begin{pmatrix}1+\alpha_n & 1-\alpha_n\\-1+\alpha_n & 1+\alpha_n\end{pmatrix}$, $\alpha_n=\frac{n}{N}, n=0,\cdots,N-1$ | $\begin{pmatrix}X_n\\Y_n\end{pmatrix}=D\begin{pmatrix}L_n\\R_n\end{pmatrix}$, $D=\begin{pmatrix}1 & 0\\0 & 1\end{pmatrix}$ | $\begin{pmatrix}X_n\\Y_n\end{pmatrix}=D\begin{pmatrix}L_n\\R_n\end{pmatrix}$, $D=\frac{1}{2}\begin{pmatrix}2-\alpha_n & \alpha_n\\-\alpha_n & 2-\alpha_n\end{pmatrix}$, $\alpha_n=\frac{n}{N}, n=0,\cdots,N-1$ | $\begin{pmatrix}X_n\\Y_n\end{pmatrix}=D\begin{pmatrix}L_n\\R_n\end{pmatrix}$, $D=\begin{pmatrix}0.5 & 0.5\\-0.5 & 0.5\end{pmatrix}$ | $\begin{pmatrix}X_n\\Y_n\end{pmatrix}=D\begin{pmatrix}L_n\\R_n\end{pmatrix}$, $D=\begin{pmatrix}0.5 & 0.5\\-0.5 & 0.5\end{pmatrix}$ |
| Up-mixing | $\begin{pmatrix}L_n\\R_n\end{pmatrix}=U\begin{pmatrix}X_n\\Y_n\end{pmatrix}$, $U=\begin{pmatrix}1 & -1\\1 & 1\end{pmatrix}$ | $\begin{pmatrix}L_n\\R_n\end{pmatrix}=\frac{1}{1+\alpha_n^2}U\begin{pmatrix}X_n\\Y_n\end{pmatrix}$, $U=\begin{pmatrix}1+\alpha_n & -1+\alpha_n\\1-\alpha_n & 1+\alpha_n\end{pmatrix}$, $\alpha_n=\frac{n}{N}, n=0,\cdots,N-1$ | $\begin{pmatrix}L_n\\R_n\end{pmatrix}=U\begin{pmatrix}X_n\\Y_n\end{pmatrix}$, $U=\begin{pmatrix}1 & 0\\0 & 1\end{pmatrix}$ | $\begin{pmatrix}L_n\\R_n\end{pmatrix}=\frac{1}{1-\alpha_n+0.5\alpha_n^2}U\begin{pmatrix}X_n\\Y_n\end{pmatrix}$, $U=\begin{pmatrix}1-\frac{1}{2}\alpha_n & -\frac{1}{2}\alpha_n\\\frac{1}{2}\alpha_n & 1-\frac{1}{2}\alpha_n\end{pmatrix}$, $\alpha_n=\frac{n}{N}, n=0,\cdots,N-1$ | $\begin{pmatrix}L_n\\R_n\end{pmatrix}=U\begin{pmatrix}X_n\\Y_n\end{pmatrix}$, $U=\begin{pmatrix}1 & -1\\1 & 1\end{pmatrix}$ | $\begin{pmatrix}L_n\\R_n\end{pmatrix}=U\begin{pmatrix}X_n\\Y_n\end{pmatrix}$, $U=\begin{pmatrix}1 & -1\\1 & 1\end{pmatrix}$ |
| EVS encoding mode | | 32kbps TCX<br>16.4kbps TCX | | 32kbps TCX<br>16.4kbps TCX | | |

FIG. 15

ENCODING DEVICE, DECODING DEVICE, ENCODING METHOD, AND DECODING METHOD

TECHNICAL FIELD

The present disclosure relates to an encoder, a decoder, a coding method, and a decoding method.

BACKGROUND ART

For example, there is a low-hit-rate multimode coding technique for a speech/audio signal (see, for example, Non Patent Literature (hereinafter, referred to as "NPL") 1).

CITATION LIST

Patent Literature

PTL 1

WO 01/47283

PTL 2

Japanese Unexamined Patent Application Publication (Translation of PCT Application) No. 20126521012

Non Patent Literature

NPL 1

3GPP TS 26.445 V16.0.0, "Codec for Enhanced Voice Services (EVS); Detailed Algorithmic Description (Release 16)", 2019-06,

SUMMARY OF INVENTION

There is scope for further study, however, on a method of improving coding performance in multimode coding.

One non-limiting and exemplary embodiment facilitates providing an encoder, a decoder, a coding method, and a decoding method each improving coding performance in multimode coding.

An encoder according to an embodiment of the present disclosure includes: down-mix circuitry; which, in operation, switches mixing processing in accordance with a characteristic of an input stereo signal and generates either one of a first stereo signal including a left-channel signal and a right-channel signal and/or a second stereo signal resulting from the mixing processing of the left-channel signal and the right-channel signal; first coding circuitry, which, in operation, performs stereo-coding on the first stereo signal; and second coding circuitry, which, in operation, performs monaural-coding on each of two signals included in the second stereo signal, wherein, the second coding circuitry performs the monaural-coding based on a coding mode in the first coding circuitry in at least one of a first period in which the first stereo signal is switched to the second stereo signal and/or a second period in which the second stereo signal is switched to the first stereo signal.

It should be noted that general or specific embodiments may be implemented as a system, an apparatus, a method, an integrated circuit, a computer program, a storage medium, or any selective combination thereof.

According to an exemplary embodiment of the present disclosure, it is possible to improve coding performance in multimode coding.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF DRAWINGS

FIG. 10 illustrates channel transformation transition in the hybrid coding system;

FIG. 15 illustrates channel transformation transition in the MS/LR stereo coding system.

DESCRIPTION OF EMBODIMENTS

Hereinafter, embodiments of the present disclosure will be described in detail with reference to the accompanying drawings.

For example, NPL 1 discloses a multimode coding technique (or a multimode speech/audio coding/decoding technique) with a low bit rate such as 13.2 kbps in an Enhanced Voice Services (EVS) codec. Although NPL 1 discloses dual mono coding tier a stereo signal (e.g., method of encoding each channel of a stereo signal as a monaural signal), a coding method for a Mid-Side (MS) stereo signal is not discussed.

In addition, PTL 1 discloses, for example, a coding technique using simulcast coding and scalable coding (or embedded coding) by switching between the two. PTL 2 discloses, for example, a coding technique seamlessly switching an MS stereo scheme and a Left-Right (LR) stereo scheme between frames.

There is scope for further study, however, on a method of improving coding performance in stereo speech/audio signal coding in which simulcast coding and scalable coding (embedded coding) are switched using multimode coding or the MS stereo scheme and the LR stereo scheme are switched.

With this regard, an embodiment of the present disclosure is provided to describe a method of improving coding performance in stereo speech/audio signal coding in which simulcast coding and scalable coding (e.g., scalable coding for an MS stereo signal with low-bit-rate multimode coding as a core) are switched using multimode coding or the MS stereo scheme and the LR stereo scheme are switched.

[Exemplary Configuration of MS Stereo Coding/Decoding System]

Figure 1:
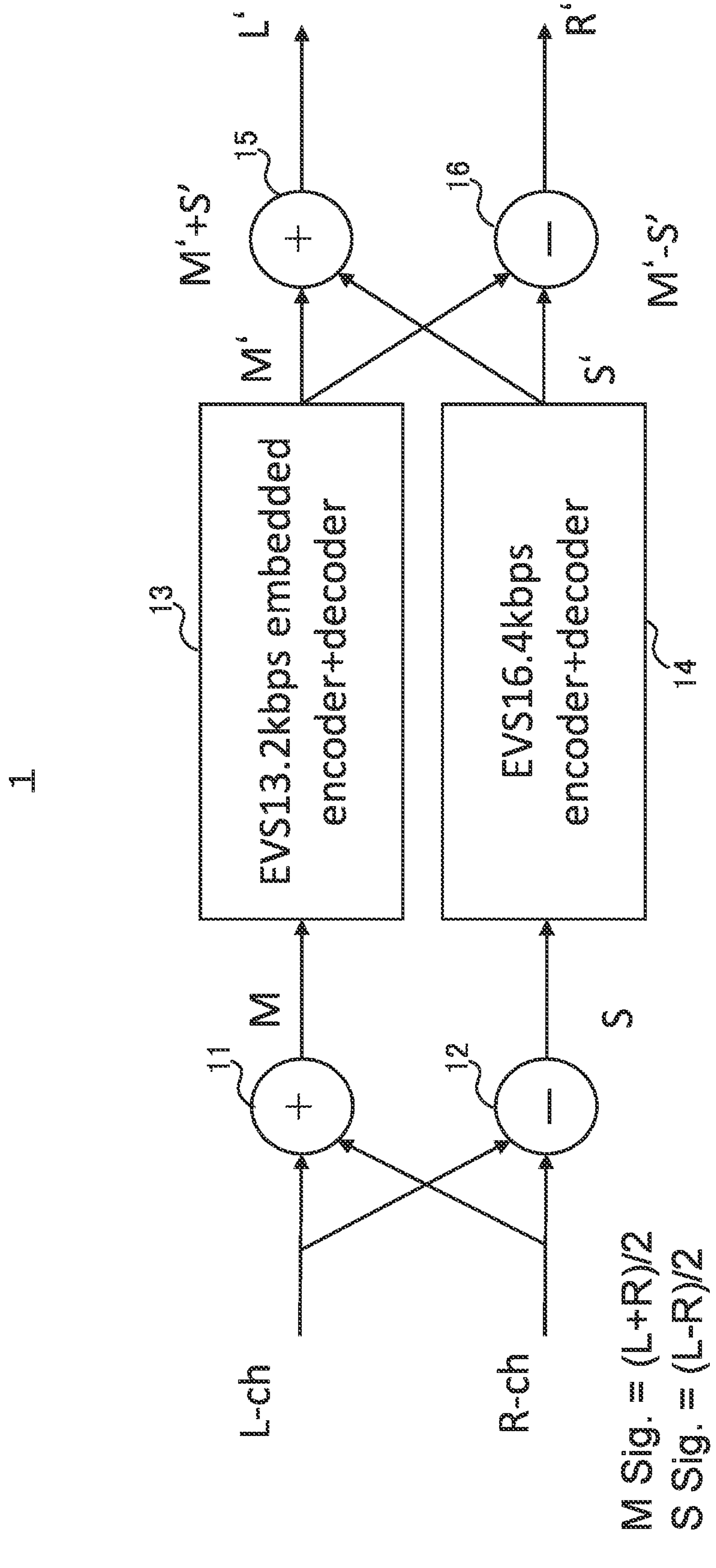
FIG. 1 illustrates an exemplary configuration of a Mid-Side (MS) stereo coding/decoding system.

FIG. 1 illustrates an exemplary configuration of MS stereo coding/decoding system 1.

For example, a stereo signal including an L-channel (left channel) and an R-charnel (right channel) may be inputted to MS stereo coding/decoding system 1.

In MS stereo coding/decoding system 1, adder 11 may generate, for example, a sum signal (also referred to as an M signal, an M channel signal, a mid signal, or a middle signal, for example) indicating the sum of the L-channel (left-channel signal) and the R-channel (right-channel signal). Further, subtractor 12 may generate, for example, a difference signal (also referred to as an S signal, an S channel signal, or a side signal, for example) indicating a difference between the L-channel and the R-channel, in other words, the L-channel and the R-channel may be transformed into two channels of the M channel and the S channel.

For example, the M signal may be given by $M(t)=0.5\times(L(t)+R(t))$, and the S signal may be given by $S(t)=0.5\times(L(t)-R(t))$. Note that the expressions of the M signal and the S signal are not limited thereto. L and R may be interchanged (that is, the expression may be $S(t)=0.5\times(R(t)-L(t))$), or a constant other than 0.5 times or a variable may be applied.

In FIG. 1, the M signal (M) may be inputted to, for example, EVS 13.2 kbps embedded encoder+decoder 13 (hereinafter, referred to as "EVS 13.2 kbps embedded encoder/decoder 13") with an EVS 13.2 kbps codec as a core. For example, EVS 13.2 kbps embedded encoder/decoder 13 may perform coding processing and decoding processing on the M signal and output the decoded M signal (M') to adder 15 and subtractor 16.

Note that, the configuration and operation of the EVS 13.2 kbps codec to be described in an exemplary embodiment of the present disclosure may be based on, for example, the configuration and operation disclosed in NPL 1.

Further, in FIG. 1, the S signal (S) may be inputted, for example, to EVS 16.4 kbps encoder+decoder 14 (hereinafter, referred to as "EVS 16.4 kbps encoder/decoder 14"). For example, EVS 16.4 kbps encoder/decoder 14 may perform coding processing and decoding processing on the S signal and output the decoded S signal (S') to adder 15 and subtractor 16.

For example, adder 15 may add the decoded M signal (M') and the decoded S signal (5') and output a decoded L-channel signal (L'). Further, for example, subtractor 16 may calculate a difference between the decoded M signal (M') and the decoded S signal (S') and output a decoded R-channel signal (R').

For example, since $M(t)+S(t)=0.5\times(L(t)-R(t))+0.5\times(L(t)-R(t))=L(t)$, a decoded L signal is determined by the addition of a decoded M signal and a decoded S signal. In the same manner, for example, since $M(t)-S(t)=0.5\times(L(t)+R(t))-0.5\times(L(t)-R(t))=R(t)$, a decoded R signal is determined by the subtraction of a decoded S signal from a decoded M signal. Note that, for example, in a case where the L-channel and the R-channel are interchanged or a constant other than 0.5 times or a variable is used in the expressions described above at the time of the transformation from the LR signal to the MS signal, inverse transform corresponding thereto may be performed.

Figure 2:
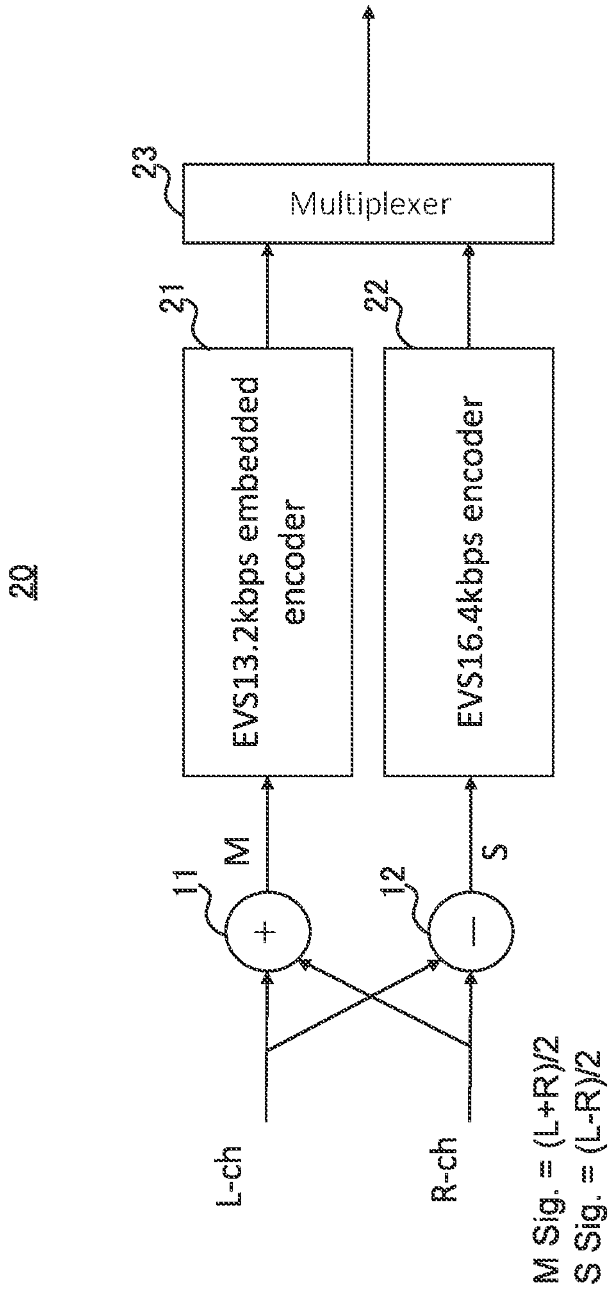
FIG. 2 illustrates an exemplary configuration of a coding system.

FIG. 2 illustrates an exemplary configuration of a coding side (referred to as coding system 20, for example) of MS stereo coding/decoding system 1 illustrated in FIG. 1. Note that, in FIG. 2, the same components as those in FIG. 1 (e.g., adder 11 and subtractor 12) are denoted by the same reference signs and descriptions thereof will be omitted.

For example, EVS 13.2 kbps embedded encoder 21 may perform coding processing on the M signal to be inputted and output a coding result (e.g., coding information of the M signal) to multiplexer 23. For example, EVS 16.4 kbps encoder 22 may perform coding processing on the S signal to be inputted and output a coding result (e.g., coding information of the S signal) to multiplexer 23. For example, multiplexer 23 may multiplex the coding information of the M signal inputted from EVS 13.2 kbps embedded encoder 21 and the coding information of the S signal inputted from EVS 16.4 kbps encoder 22, and output the generated multiplexed signal (e.g., MS stereo coding bitstream) to a transmission path or a storage apparatus.

Figure 3:
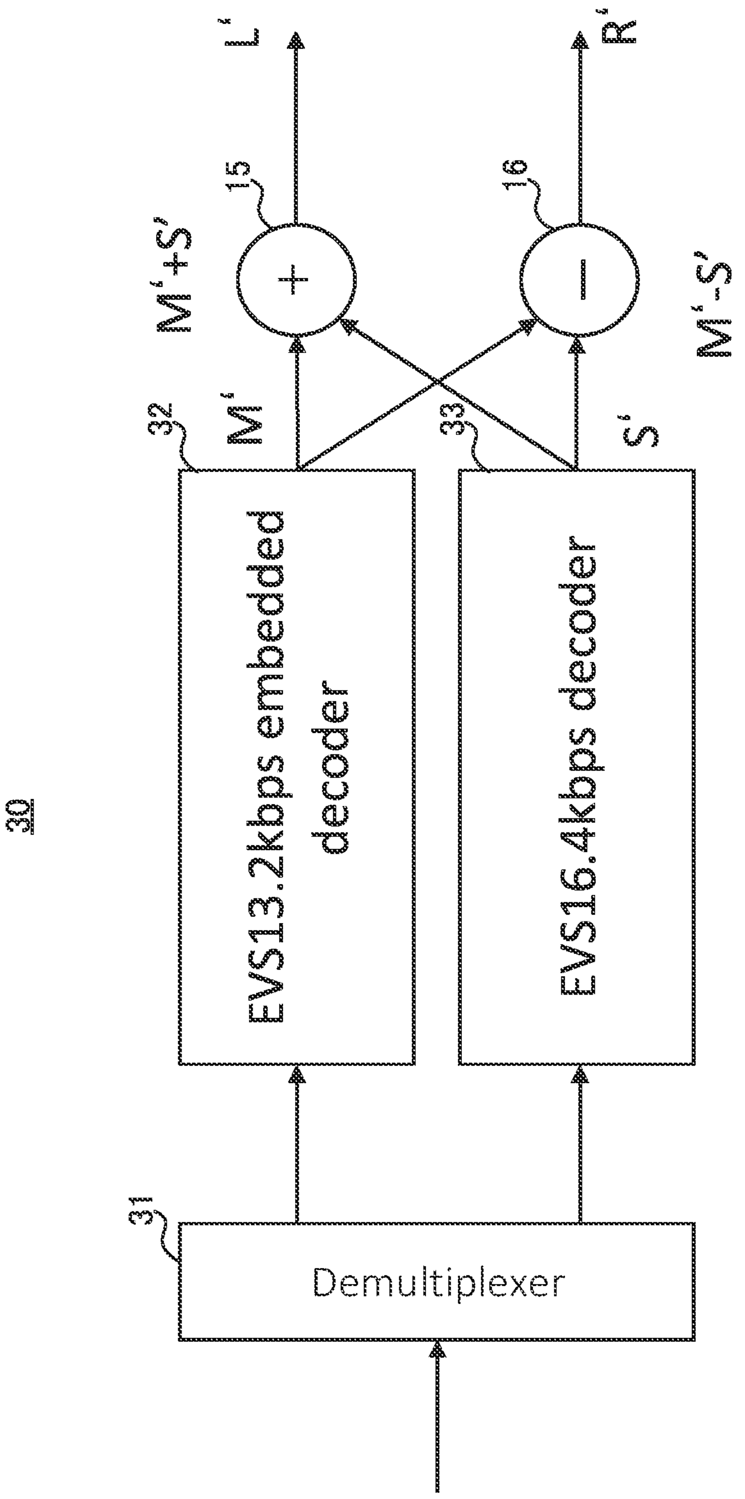
FIG. 3 is a block diagram illustrating an exemplary configuration of a decoding system.

FIG. 3 illustrates an exemplary configuration of a decoding side (referred to as decoding system 30, for example) of MS stereo coding/decoding system 1 illustrated in FIG. 1. Note that, in FIG. 3, the same components as those in FIG. 1 (e.g., adder 15 and subtractor 16) are denoted by the same reference signs and descriptions thereof will be omitted.

Demultiplexer 31 may demultiplex the MS stereo coding bitstream (e.g., output signal from multiplexer 23 in FIG. 2) inputted from the transmission path or the storage apparatus into the coding information of the M signal and the coding information of the S signal. For example, demultiplexer 31 may output the coding information of the M to EVS 13.2 kbps embedded decoder 32 and output the coding information of the S signal to EVS 16.4 kbps decoder 33. For example, EVS 13.2 kbps embedded decoder 32 may perform decoding processing on the coding information of the M signal inputted from demultiplexer 31 and output the decoded M signal (M') to adder 15 and subtractor 16. For example, EVS 16.4 kbps decoder 33 may perform decoding processing on the coding information of the S signal inputted from demultiplexer 31 and output the decoded signal S (S') to adder 15 and subtractor 16.

An exemplary configuration of MS stereo coding/decoding system 1 has been described, thus far.

For example, EVS 13.2 kbps embedded encoder 21 illustrated in FIG. 2 may be a scalable encoder in which an enhanced coding layer (or referred to as an enhancement layer) of 32 kbps is incorporated into a core coding layer (or referred to as a core layer) of EVS 13.2 kbps.

Here, the EVS 13.2 kbps of the core layer may include three coding modes, for example. The three coding modes are, for example, a "linear prediction (LP)-based coding mode", a "modified discrete cosine transform (MDCT)-based transform coded excitation (TCX) coding mode", and a "low rate-high quality (LR-HQ) coding mode". For example, EVS 13.2 kbps embedded encoder 21 may switch between these coding modes in accordance with a characteristic of an input signal.

The LP-based coding mode is, for example, a coding mode in time domain. In addition, the LP-based coding mode may further include a plurality of coding modes (also referred to as sub-modes) in accordance with a characteristic of an input signal.

Further, the MDCT-based TCX coding mode and the LR-HQ coding mode are, for example, coding modes in frequency domain.

EVS 13.2 kbps embedded encoder 21 and EVS 13.2 kbps embedded decoder 32 may determine (i.e., select or switch)

a coding mode (or a coding method) used for coding in the enhancement layer based on, for example, a coding mode used for coding in the core layer.

For example, EVS 13.2 kbps embedded encoder 21 may encode (e.g., perform core layer coding on), in the core layer, an input signal (e.g., the M signal of the MS stereo signal) by selectively using coding (or a coding mode) in the time domain or the frequency domain in accordance with a characteristic of the input signal, and may encode (e.g., perform enhancement layer coding on), in the enhancement layer with respect to the core layer, a coding error due to the core layer coding by using coding (or a coding mode) corresponding to the domain type (e.g., the time domain or the frequency domain) of the coding used in the core layer.

Further, for example, EVS 13.2 kbps embedded decoder 32 may decode, in the core layer, coding information (e.g., core layer coding information) of the input signal (e.g., the M signal of the MS stereo signal) encoded by selectively using coding in the time domain or the frequency domain in accordance with a characteristic of the input signal, and may decode, in the enhancement layer with respect to the core layer, coding information (e.g., enhancement layer coding information) of a coding error due to the core layer coding, where the coding error is encoded by using a coding method corresponding to the domain type of the coding used in the core layer.

[Exemplary Configuration of Simulcast Coding/Scalable Coding Hybrid System]

For example, there is a technique related to a coding system in which scalable coding (embedded coding) and simulcast coding are switched between the two (see, for example, PTL 1) (such a system is hereinafter referred to as a hybrid coding system).

<Exemplary Configuration of Hybrid Coding System>

Figure 4:
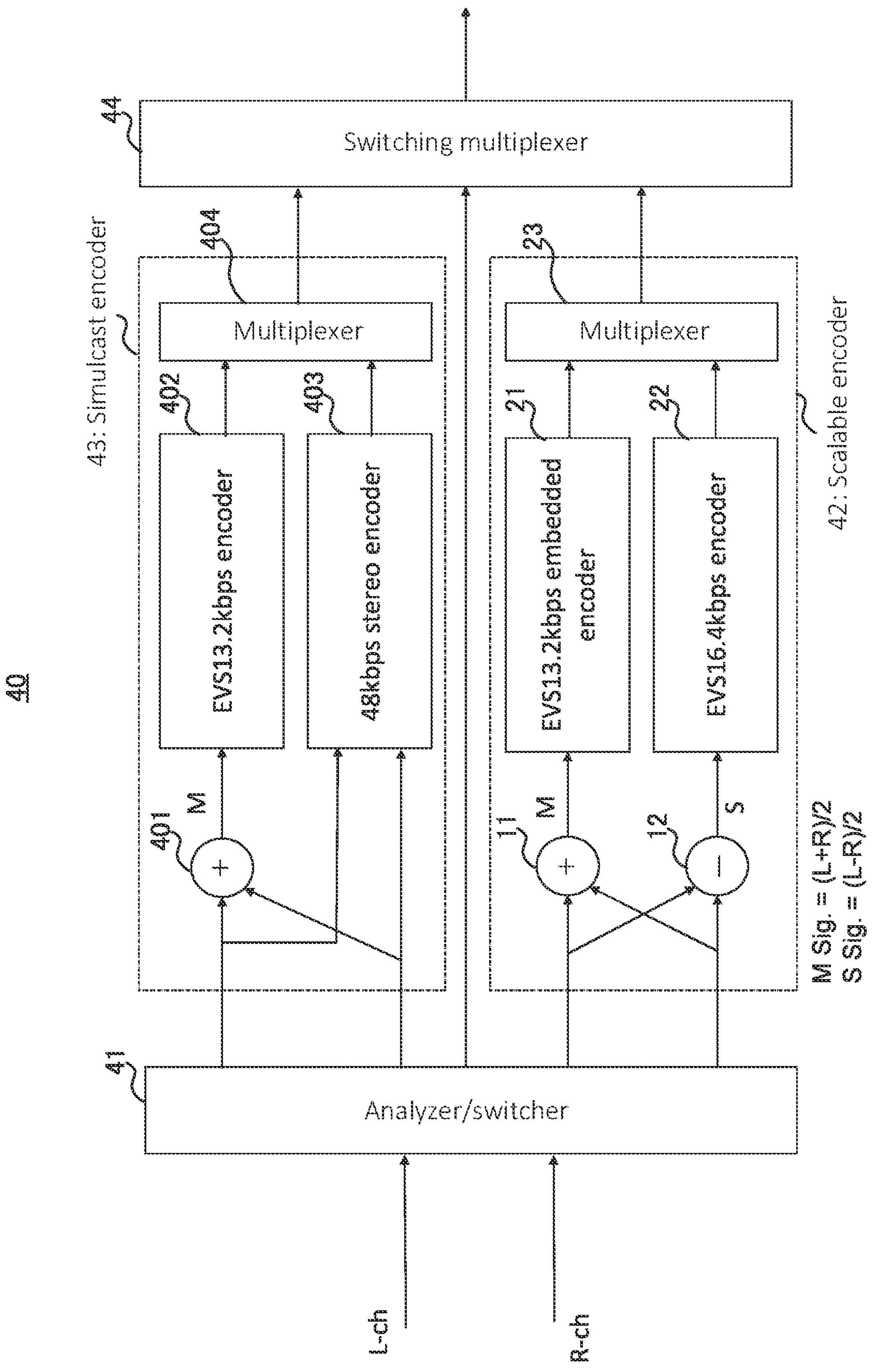
FIG. 4 illustrates an exemplary configuration of a hybrid coding system.

FIG. 4 illustrates an exemplary configuration of a hybrid coding system according to an embodiment of the present disclosure.

Hybrid coding system 40 illustrated in FIG. 4 includes analyzer/switcher 41 (corresponding to, for example, an analysis apparatus), scalable encoder 42, simulcast encoder 43, and switching multiplexer 44. In hybrid coding system 40, for example, scalable encoder 42 and simulcast encoder 43 are switched between the two.

Analyzer/switcher 41 receives an input of a stereo signal (e.g., L-channel (left channel) signal and R-channel (right channel) signal) and performs analysis based on channel correlation. For example, analyzer/switcher 41 may output the stereo signal to either one of scalable encoder 42 and simulcast encoder 43 based on the analysis result. In other words, analyzer/switcher 41 may switch the output destination of the stereo signal between scalable encoder 42 and simulcast encoder 43 based on the analysis result, for example. In addition, analyzer/switcher 41 may output, for example, switching information indicating the output destination of the stereo signal to switching multiplexer 44.

In the analysis based on channel correlation, analyzer/switcher 41 may, for example, calculate the cross-correlation between the L-channel signal and the R-channel signal to determine whether the maximum cross-correlation exceeds a threshold, or may determine whether the magnitude or energy of the cross-spectrum between the L-channel and the R-channel exceeds a threshold. To enhance the stability between frames, analyzer/switcher 41 may include, in the analysis, a process of smoothing the analysis results between frames, a hangover process, and a process that produces similar effects to those.

For example, in the analysis based on channel correlation, when a value related to the channel correlation (e.g., the maximum value, or the magnitude or energy of the cross-spectrum) exceeds a threshold, the inter-channel correlation is high and coding performance tends to be high in the MS stereo coding scheme, and thus, the scalable (or embedded) coding scheme according to an embodiment of the present disclosure may be applied. For example, when a value related to the channel correlation exceeds the threshold, analyzer/switcher 41 may switch the output destination of the stereo signal to scalable encoder 42.

Meanwhile, in the analysis based on channel correlation, for example, when a value related to the channel correlation is equal to or less than the threshold, the inter-channel correlation is low and it is difficult to gain high coding performance in the MS stereo coding scheme, and thus, the scalable coding scheme according to an embodiment of the present disclosure need not be applied. In this case, for example, a simulcast coding scheme of stereo coding and EVS coding that also take into account coding of a stereo signal with low inter-channel correlation may be applied. For example, when a value related to the channel correlation is equal to or less than the threshold, analyzer/switcher 41 may switch the output destination of the stereo signal to simulcast encoder 43.

Further, for example, when the L-channel and R-channel signals have a phase difference and the cross-correlation is increased by correcting the phase difference, analyzer/switcher 41 may output the stereo signal by performing a process of shifting the phase of at least one of the L-channel and the R-channel by the amount of phase difference that maximizes the cross-correlation. When shifting the phase of the stereo signal, analyzer/switcher 41 may encode phase information and multiplex it to coding information.

Scalable encoder 42 may be, for example, a scalable encoder similar to coding system 20 illustrated in FIG. 2. In FIG. 4, the components included in scalable encoder 42 are marked with the same numbers as those included in coding system 20 illustrated in FIG. 2, and the description of the components and operation will be omitted. Scalable encoder 42 may, for example, receive an input of the stereo signal from analyzer/switcher 41 and output a coding result to switching multiplexer 44.

Simulcast encoder 43 includes, for example, down-mixer (adder) 401 that down-mixes the stereo signal, EVS encoder 402 (e.g., EVS 13.2 kbps encoder) that encodes a monaural signal obtained by down-mixing, stereo encoder 403 (e.g., 48 kbps stereo encoder) that encodes the stereo signal, and multiplexer 404 that multiplexes the coding information.

For example, adder 401 adds (down-mixes) the L-channel signal and the R-channel signal of the inputted stereo signal to generate monaural signal M, and outputs monaural signal M to EVS encoder 402 (13.2 kbps).

For example, EVS encoder 402 performs coding of monaural signal M inputted from adder 401, and outputs a coding result to multiplexer 404. For example, EVS encoder 402 may perform the same coding as the coding in the core layer by the EVS 13.2 kbps embedded encoder or may perform the coding processing at 13.2 kbps indicated in NPL 1.

For example, stereo encoder 403 performs coding of the stereo signal inputted from analyzer/switcher 41, and outputs a coding result to multiplexer 404. For example, stereo encoder 403 may perform coding processing at 48 kbps or may perform coding processing such that the bit rate is the same as or comparable to that of the scalable encoder together with EVS coding at 13.2 kbps.

For example, multiplexer 404 may multiplex the 13.2 kbps coding information inputted from EVS encoder 402 and the coding information (e.g., 48 kbps coding information) inputted from stereo encoder 403 and output the multiplexed coding information to switching multiplexer 44.

An exemplary configuration of simulcast encoder 43 has been described, thus far.

In hybrid coding system 40, for example, switching multiplexer 44 may multiplex the switching information inputted from analyzer/switcher 41 and the coding result inputted from either scalable encoder 42 or simulcast encoder 43 in accordance with the switching information, and output the multiplexed switching information and coding result as a bitstream to the transmission path or the storage medium.

<Exemplary Configuration of Hybrid Decoding System>

Figure 5:
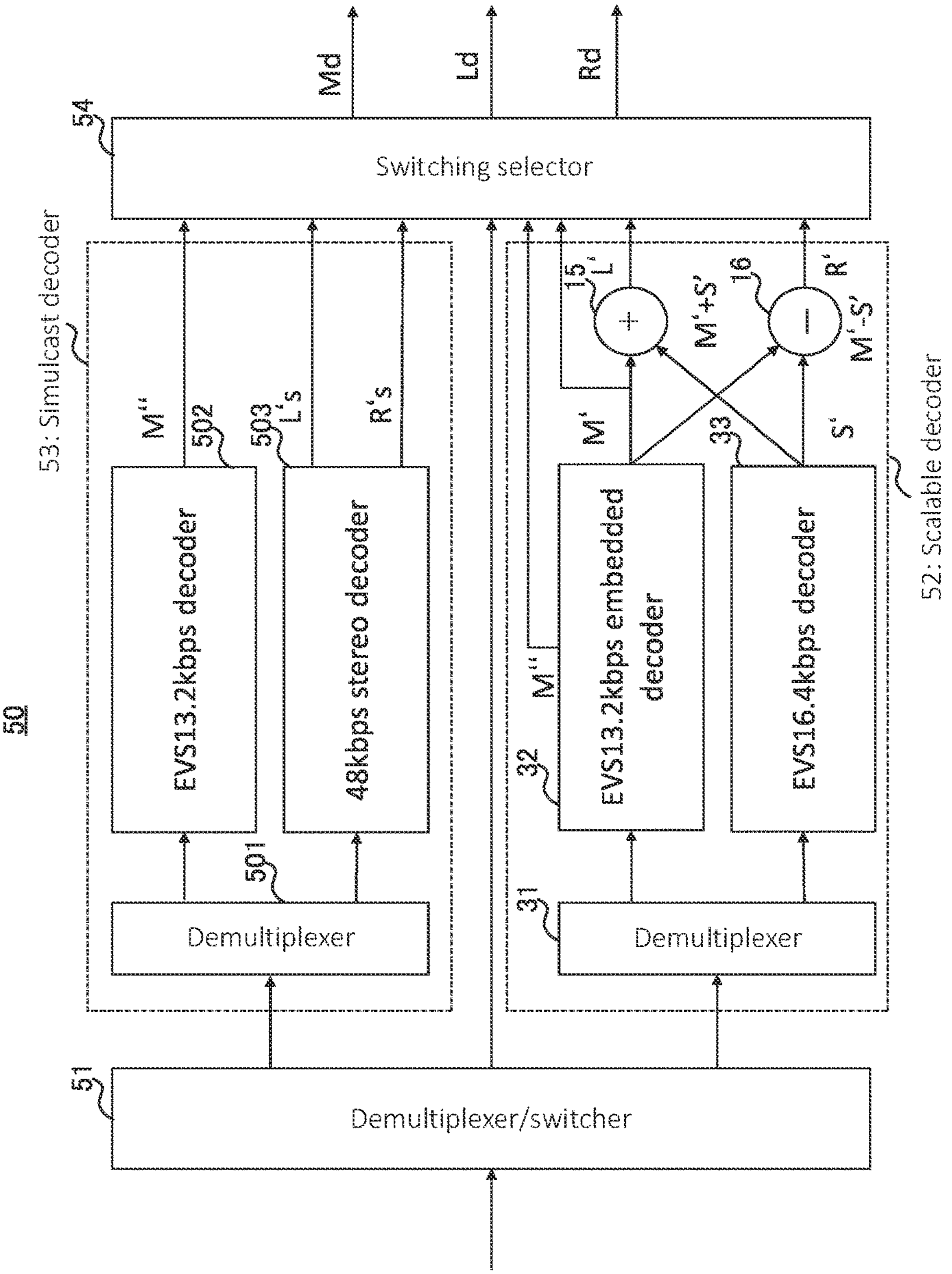
FIG. 5 illustrates an exemplary configuration of a hybrid decoding system.

FIG. 5 illustrates an exemplary configuration of a hybrid decoding system according to an embodiment of the present disclosure.

Hybrid decoding system 50 illustrated in FIG. 5 includes demultiplexer/switcher 51, scalable decoder 52, simulcast decoder 53, and switching selector 54. In hybrid decoding system 50, for example, scalable decoder 52 and simulcast decoder 53 are switched between the two.

For example, demultiplexer/switcher 51 may receive an input of a bitstream from the transmission path or the storage medium, demultiplex the multiplexed information, and output the coding information to either one of scalable decoder 52 and simulcast decoder 53 based on the demultiplexed and decoded switching information.

Scalable decoder 52 may be, for example, a scalable decoder similar to decoding system 30 illustrated in FIG. 3. In FIG. 5, the components included in scalable decoder 52 are marked with the same numbers as those included in decoding system 30 illustrated in FIG. 3, and the description of the components and operation will be omitted.

EVS 13.2 kbps embedded decoder 32, however, may output M", which is a decoded monaural signal based solely on the core layer, in addition to the decoded monaural signal M', for example. The decoded monaural signal outputted from EVS 13.2 kbps embedded decoder 32 may be either one of M' and M".

For example, scalable decoder 52 may decode the coding bitstream inputted from demultiplexer/switcher 51 and output decoded monaural signals M' and M" and decoded stereo signals L' and R' to switching selector 54.

Simulcast decoder 53 includes, for example, demultiplexer 501, EVS decoder 502 (e.g., EVS 13.2 kbps decoder), and stereo decoder 503 (e.g., 48 kbps stereo decoder).

For example, demultiplexer 501 may demultiplex the bitstream inputted from demultiplexer/switcher 51 into an EVS coding bitstream and a stereo coding bitstream, output the EVS coding bitstream to EVS decoder 502, and output the stereo coding bitstream to stereo decoder 503.

For example, EVS decoder 502 may decode the EVS coding bitstream inputted from demultiplexer 501 and output decoded monaural signal M" to switching selector 54.

For example, stereo decoder 503 may decode the stereo coding bitstream inputted from demultiplexer 501 and output decoded stereo signals L's and R's to switching selector 54.

An exemplary configuration of simulcast decoder 53 has been described, thus far.

In hybrid decoding system 50, for example, switching selector 54 may receive inputs of the decoded monaural signal and the decoded stereo signals from either scalable decoder 52 or simulcast decoder 53 in accordance with the switching information inputted from demultiplexer/switcher 51, and output final signals of decoded monaural signal Md and decoded stereo signals Ld and Rd to a sound output device via a D/A converter etc.

As described above, in hybrid coding system 40, analyzer/switcher 41 calculates the cross-correlation between channels in an input signal (e.g., stereo signal), switches an output destination of the input signal to scalable encoder 42 when the maximum value of the cross-correlation (or the magnitude or energy of the cross-spectrum) exceeds a threshold, and switches the output destination of the input signal to simulcast encoder 43 when the maximum value of the cross-correlation is equal to or less than the threshold. This switching of the output destination of the input signal allows hybrid coding system 40 to switch whether the MS stereo coding is applied in accordance with the channel correlation of the input signal, thereby improving the coding performance.

<Exemplary Variation of Hybrid Coding System>

Figure 6:
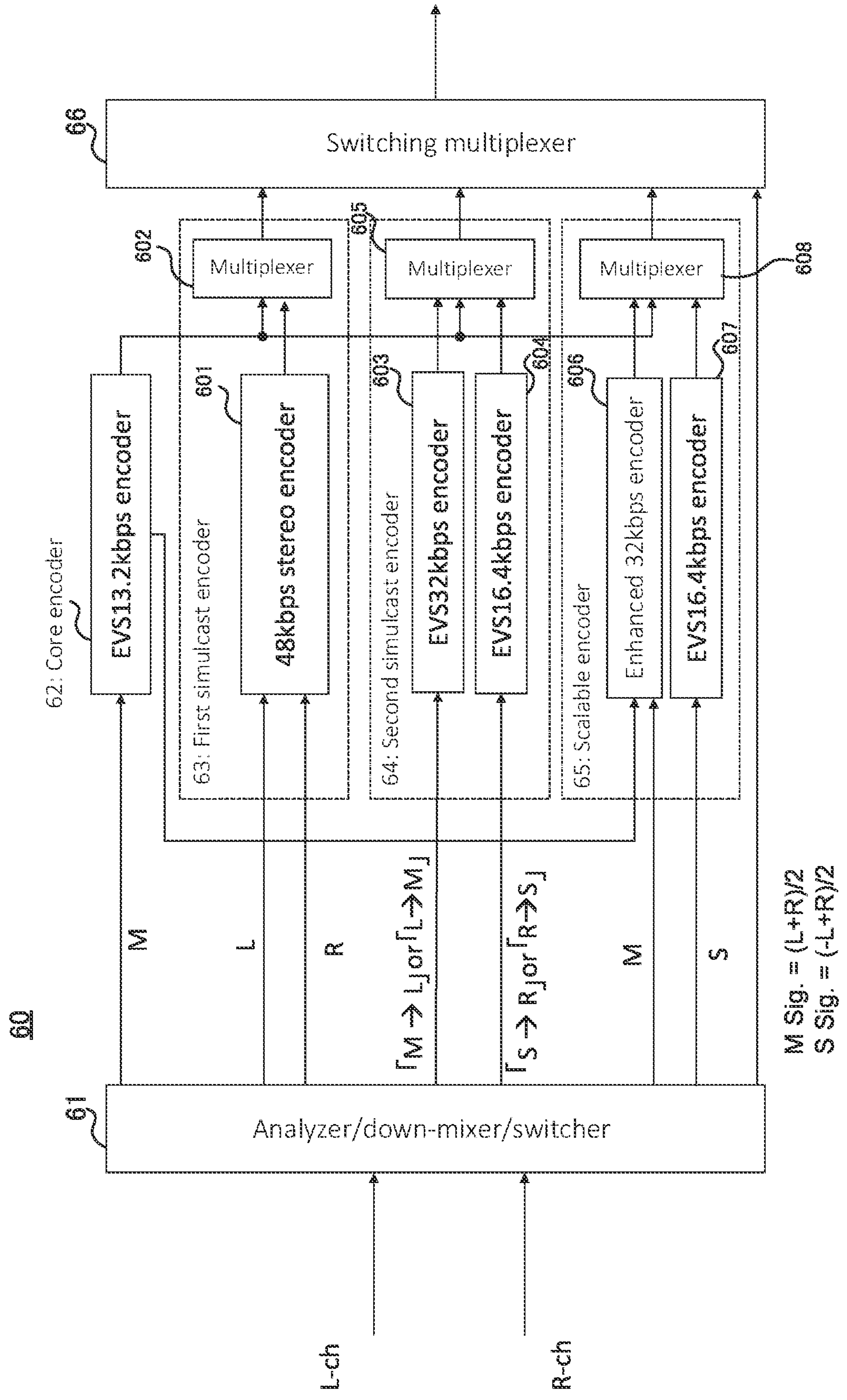
FIG. 6 illustrates an exemplary configuration of the hybrid coding system.

FIG. 6 illustrates an exemplary configuration of the hybrid coding system according to an embodiment of the present disclosure.

Hybrid coding system 60 illustrated in FIG. 6 may include analyzer/down-mixer/switcher 61 (including, for example, down-mix circuitry), core encoder 62, first simulcast encoder 63, second simulcast encoder 64, scalable encoder 65, and switching multiplexer 66.

Core encoder 62 may be, for example, an EVS 13.2 kbps encoder. First simulcast encoder 63 may include, for example, LR stereo encoder 601 (e.g., 48 kbps stereo encoder) and multiplexer 602. Second simulcast encoder 64 may include, for example, two monaural encoders 603 and 604 (e.g., EVS 32 kbps encoder and EVS 16.4 kbps encoder) and multiplexer 605. Scalable encoder 65 may include enhanced encoder 606 (e.g., 32 kbps encoder), monaural encoder 607 (e.g., EVS 16.4 kbps encoder), and multiplexer 608.

For example, in hybrid coding system 60, first simulcast encoder 63, second simulcast encoder 64, and scalable encoder 65 may be switched between the three. For example, first simulcast encoder 63 may correspond to first coding circuitry that performs coding on a stereo signal including an L-channel signal and an R-channel signal (e.g., referred to as an "LR stereo signal"), and second simulcast encoder 64 may correspond to second coding circuitry that encodes each of two-channel signals obtained by mixing processing (channel transformation processing, matrix transformation processing, and matrixing) between the L-channel signal and the R-channel signal.

Analyzer/down-mixer/switcher 61 receives, for example, an input of a stereo signal (e.g., L-channel (left channel) signal and R-channel (right channel) signal), performs analysis based on channel correlation, and performs down-mix processing on the two channels based on the analysis result. For example, analyzer/down-mixer/switcher 61 may perform, on the stereo signal, down mix processing (channel transformation processing) determined based on the analysis result, and output the stereo signal after the down-mix processing to any of first simulcast encoder 63, second simulcast encoder 64, and scalable encoder 65. In other words, analyzer/down-mixer/switcher 61 may, for example, switch the output destination of the stereo signal subjected to appropriate channel transformation processing based on the analysis result between first simulcast encoder 63, second simulcast encoder 64, and scalable encoder 65.

Further, analyzer/down-mixer/switcher 61 may output, to switching multiplexer 66, switching information indicating, for example, the down-mix method and the output destination of the stereo signal.

Further, for example, analyzer/down-mixer/switcher 61 may calculate an M signal obtained by mono-down-mixing the L-channel signal and the R-channel signal regardless of the analysis result, and output the M signal to core encoder 62.

In the analysis based on channel correlation, analyzer/down-mixer/switcher 61 may for example, calculate the cross-correlation between the L-channel signal and the R-channel signal to determine whether the maximum cross-correlation exceeds a threshold, or may determine Whether the magnitude or energy of the cross-spectrum between the L-channel and the R-channel exceeds a threshold. To enhance the stability between frames, a process of smoothing the analysis results in analyzer/down-mixer/switcher 61 between frames, a hangover process, and a process that produces similar effects to those may be included in the analysis.

For example, in the analysis based on channel correlation, when a value related to the channel correlation (e.g., the maximum value, or the magnitude or energy of the cross spectrum) exceeds a threshold, the inter-channel correlation is high and coding performance tends to be high in the MS stereo coding scheme, and thus, the scalable (or embedded) coding scheme according to an embodiment of the present disclosure may be applied. For example, when a value related to the channel correlation exceeds the threshold, analyzer/down-mixer/switcher 61 may switch the output destination of the stereo signal subjected to the channel transformation processing described below to scalable encoder 65.

Here, the channel transformation processing (down-mix processing) is represented by, for example, the following Expression 1.

[1]

$$\begin{pmatrix} X_n \\ Y_n \end{pmatrix} = D\begin{pmatrix} L_n \\ R_n \end{pmatrix}, \quad D = \begin{pmatrix} 0.5 & 0.5 \\ -0.5 & 0.5 \end{pmatrix} \qquad \text{(Expression 1)}$$

in Expression 1, and respectively represent an L-channel signal and an R-channel signal before the transformation processing, and the subscript n represents time (sample number). In Expression 1, $X_n$ and $Y_n$ respectively represent an M-channel signal (may also be represented as $M_n$, for example) and an S-channel signal (may also be represented as $S_n$, for example) after the transformation processing.

For example, in the analysis based on channel correlation, for example, when a value related to the channel correlation is equal to or less than the threshold, the inter-channel correlation is low and it is difficult to achieve high coding performance in the MS stereo coding scheme, and thus, the scalable coding scheme according to an embodiment of the present disclosure need not be applied. In this case, for example, a simulcast coding scheme of stereo coding and EVS coding that also take into account coding of a stereo signal with low inter-channel correlation may be applied. For example, when a value related to the channel correlation is equal to or less than the threshold, analyzer/down-mixer/switcher 61 may switch the output destination of the stereo signal subjected to the channel transformation processing described below to first simulcast encoder 63.

Here, the channel transformation processing (down-mix processing) is represented by, for example, the following Expression 2.

[2]

$$\begin{pmatrix} X_n \\ Y_n \end{pmatrix} = D\begin{pmatrix} L_n \\ R_n \end{pmatrix}, \quad D = \begin{pmatrix} 1 & 0 \\ 0 & 1 \end{pmatrix} \qquad \text{(Expression 2)}$$

In the transformation processing represented in Expression 2, the L-channel signal is configured to be the transformed channel signal $X_n(=L_n)$ as it is, and the R-channel signal is configured to be the transformed channel signal $Y_n(=R_n)$ as it is.

As described above, analyzer/down-mixer/switcher 61 may switch the mixing processing in accordance with a characteristic (e.g., channel correlation) of an input stereo signal, and generate either a stereo signal including an L-channel signal and an R-channel signal (e.g., LR stereo signal obtained by Expression 2) or a stereo signal obtained by mixing processing of an L-channel signal and an R-channel signal (e.g., stereo signal obtained by Expression 1, which is referred to as an "MS stereo signal", for example). For example, analyzer/down-mixer/switcher 61 may generate the LR stereo signal when a correlation value between the L-channel signal and the R-channel signal included in the input stereo signal is equal to or less than a threshold, and may generate the MS stereo signal when the correlation value exceeds the threshold.

It is assumed that the transformation matrix is expressed as follows.

$$\begin{pmatrix} a & b \\ c & d \end{pmatrix} \qquad [3]$$

When the transformation processing of Expression 1 is gradually changed to the transformation processing of Expression 2, a changes from 0.5 to 1, b changes from 0.5 to 0, c changes from −0.5 to 0, and d changes from 0.5 to 1. In this case, $0.25 \le a \times d \le 1$ and $-0.25 \le b \times c \le 0$, and it is guaranteed that $ad-bc \neq 0$, so that the transformation matrix is regular and an inverse matrix (transformation matrix for up-mixing) exists. That is, there is an inverse transform (corresponding to up-mix transform, for example, transformation processing represented by Expressions 6 to 8) corresponding to intermediate transformation processing (e.g., transformation processing represented by Expressions 3 to 4) between Expressions 1 and 2, and thus the transformation processing can be gradually changed. Meanwhile, it is assumed that the transformation matrix of Expression 1 is expressed as follows, that is, the difference signal is defined as (L-channel signal—R-channel signal).

$$\begin{pmatrix} 0.5 & 0.5 \\ 0.5 & -0.5 \end{pmatrix} \qquad [4]$$

When the transformation processing is gradually changed in the same manner, a changes from 0.5 to 1, b changes from 0.5 to 0, c changes from 0.5 to 0, and d changes from −0.5 to 1. In this case, 0≤b×c≤0.25 while −0.25≤a×d≤1, and a point appears where ad−bc=0 (the transformation matrix is not regular). There is no inverse matrix at such a point, and forcing to obtain an inverse matrix would result in calculating 1/0, which leads to huge values for the elements of the transformation matrix. That is, there is no inverse transform corresponding to such transformation processing, and it is thus impossible to gradually change the transformation processing on the up-mix side. As described above, defining the transformation processing to an MS stereo signal as in Expression 1 guarantees the regularity of the intermediate transformation matrix between Expressions 1 and 2, and allows for continuous changes in the transformation processing.

Incidentally, when scalable encoder 65 (MS stereos coding) and first simulcast encoder 63 (LR stereo coding) in the present disclosure are switched between the two, there may be discontinuity between frames at the time of switching that is caused by switching between an LR stereo signal and an MS stereo signal. To resolve this discontinuity, for example, it is preferable to provide a period in which an MS stereo signal gradually changes to an LR stereo signal (e.g., "MS->LR transition period") when the switching destination of the stereo signal is switched from scalable encoder 65 to first simulcast encoder 63. Likewise, it is preferable to provide a period in which an LR stereo signal gradually changes to an MS stereo signal (e.g., "LR->MS transition period") when the switching destination of the stereo signal is switched from first simulcast encoder 63 to scalable encoder 65.

The channel transformation processing in the MS->LR transition period may be represented by, for example, the following Expression 3.

[5]

$$\begin{pmatrix} X_n \\ Y_n \end{pmatrix} = D\begin{pmatrix} L_n \\ R_n \end{pmatrix}, \quad \text{(Expression 3)}$$

$$D = \frac{1}{2}\begin{pmatrix} 1+\alpha_n & 1-\alpha_n \\ -1+\alpha_n & 1+\alpha_n \end{pmatrix},$$

$$\alpha_n = \frac{n}{N}, \; n = 0, \ldots, N-1$$

Here, N represents the frame length (or transition period length). Transition period length N may be shorter than one frame, for example. In Expression 3, channel signal $X_n$ may represent, for example, M-L transition signal "M->L", and channel signal $Y_n$ may represent, for example, S-R transition signal "S->R".

In addition, the channel transformation processing in the LR->MS transition period may be represented by, for example, the following Expression 4.

[6]

$$\begin{pmatrix} X_n \\ Y_n \end{pmatrix} = D\begin{pmatrix} L_n \\ R_n \end{pmatrix}, \quad \text{(Expression 4)}$$

$$D = \frac{1}{2}\begin{pmatrix} 2-\alpha_n & \alpha_n \\ -\alpha_n & 2-\alpha_n \end{pmatrix},$$

$$\alpha_n = \frac{n}{N}, \; n = 0, \ldots, N-1$$

Here, N represents the frame length (or transition period length). Transition period length N may be shorter than one frame, for example. In Expression 4, channel signal $X_n$ may represent, for example, L-M transition signal "L->M", and channel signal $Y_n$ may represent, for example, R-S transition signal "R->S".

In the MS->LR transition period and the LR->MS transition period, analyzer/down-mixer/switcher 61 may switch the output destination of the stereo signal subjected to the channel transformation processing to second simulcast encoder 64.

For example, when switching the output destination of the stereo signal from scalable encoder 65 to first simulcast encoder 63, analyzer/down-mixer/switcher 61 may perform switching control so that the output destination of the stereo signal is first switched to second simulcast encoder 64 in the MS->LR transition period (e.g., certain frame), and the output destination of the stereo signal is then switched to first simulcast encoder 63 in the next frame.

Likewise, for example, when switching the output destination of the stereo signal from first simulcast encoder 63 to scalable encoder 65, analyzer/down-mixer/switcher 61 may perform switching control so that the output destination of the stereo signal is first switched to second simulcast encoder 64 in the LR->MS transition period (e.g., certain frame), and the output destination of the stereo signal is then switched to scalable encoder 65 in the next frame.

Figure 7:
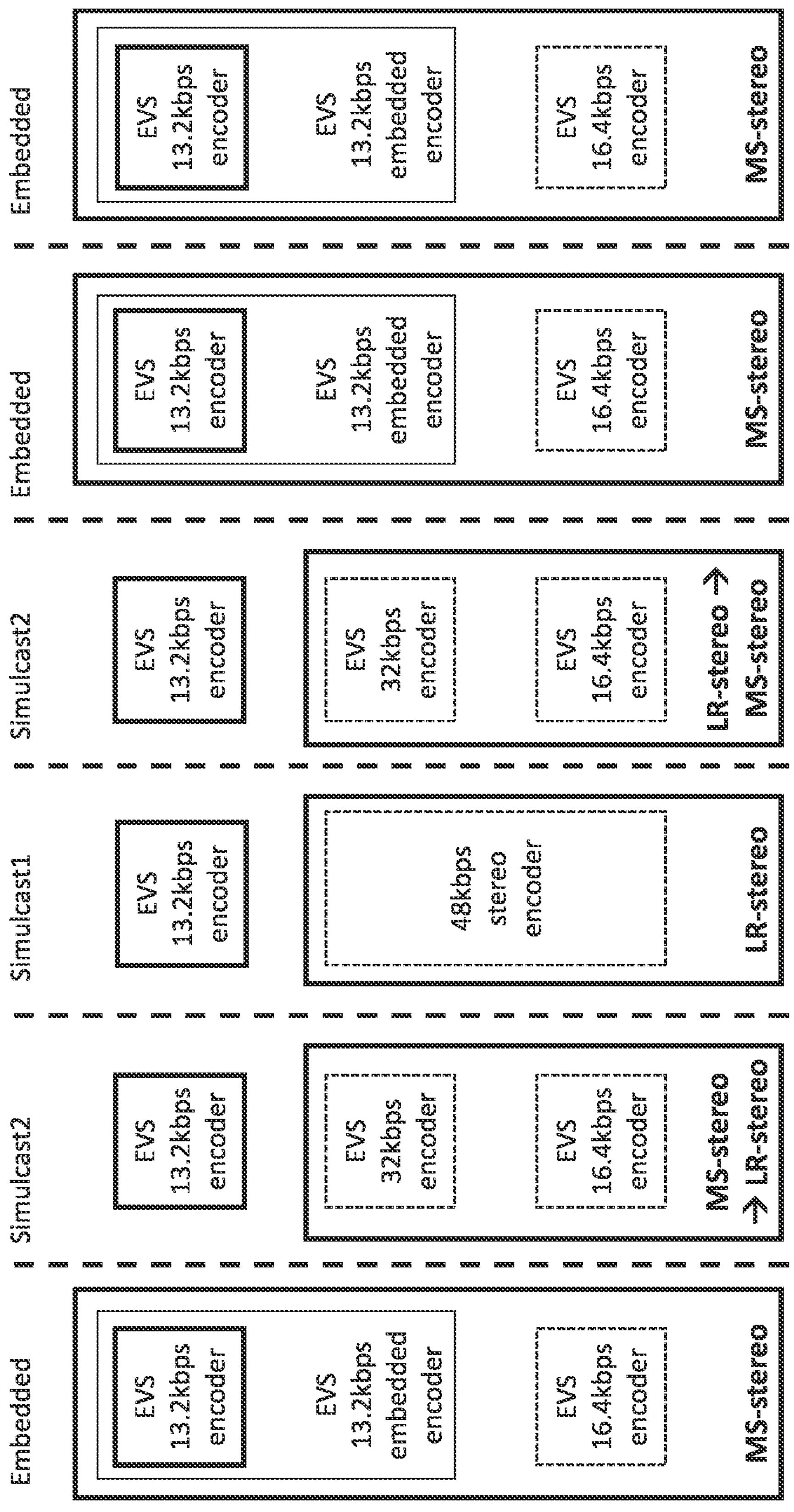
FIG. 7 illustrates embedded; simulcast switching transition in the hybrid coding system.

FIG. 7 illustrates such switching transition between simulcast coding and scalable coding. FIG. 7 illustrates a state of switching encoders over six frames, by way of example. Time elapses from the left end to the right end of FIG. 7, and frames are separated by broken lines.

In the example illustrated in FIG. 7, the left-end frame (the first frame from the left) is a frame in which scalable encoder 65 (Embedded) is selected. The second frame from the left is a frame in which second simulcast encoder 64 (Simulcast 2) that performs coding in the MS->LR transition period is selected. The third frame from the left is a frame in which first simulcast encoder 63 (Simulcast 1) is selected. The fourth frame from the left is a frame in which second simulcast encoder 64 (Simulcast 2) that performs coding in the LR->MS transition period is selected. The fifth frame from the left is a frame in which scalable encoder 65 (Embedded) is selected. The sixth frame from the left (the right-end frame) is a frame in which scalable encoder 65 (Embedded) is selected.

The last two frames (the fifth and sixth frames from the left) illustrated in FIG. 7 are both frames in which scalable encoder 65 (Embedded) is selected, but an EVS 13.2 kbps coding mode may be handled differently, an example of which will be described later.

In FIG. 6, for example, core encoder 62 (EVS 13.2 kbps encoder) receives, from analyzer/down-mixer/switcher 61, an input of an M-channel signal obtained by mono-down-mixing an L-channel signal and an R-channel signal, encodes the M-channel signal, and outputs the coding result of the M-channel signal to multiplexers 602, 605, and 608. In addition, core encoder 62, for example, outputs core coding information to be used tar enhanced coding to enhanced encoder 606 (enhanced 32 kbps encoder) of scalable encoder 65.

In FIG. 6, for example, first simulcast encoder 63 receives inputs of an L-channel signal and an R-channel signal from analyzer/down-mixer/switcher 61, performs coding processing in LR stereo encoder 601 (48 kbps stereo encoder), and outputs stereo coding information to multiplexer 602. For example, first simulcast encoder 63 multiplexes the core coding information outputted from core encoder 62 (EVS 13.2 kbps encoder) and the stereo coding information outputted from LR stereo encoder 601 (48 kbps stereo encoder) in multiplexer 602, and outputs the multiplexed bitstream to switching multiplexer 66.

In FIG. 6, for example, second simulcast encoder 64 receives, from analyzer/down-mixer/switcher 61, inputs of a signal changing from an M-channel signal to an L-channel signal (or a signal changing from an L-channel signal to an M-channel signal) and a signal changing from an R-channel signal to an S-channel signal (or a signal changing from an S-channel signal to an R-channel signal), performs coding processing on the signals respectively using different monaural encoders 603 and 604 (e.g., EVS 32 kbps encoder and EVS 16.4 kbps encoder), and outputs the respective coding results to multiplexer 605. For example, second simulcast encoder 64 multiplexes the core coding information outputted from core encoder 62 (EVS 13.2 kbps encoder) and the coding information outputted from each of monaural encoders 603 and 604 (EVS 32 kbps encoder, and EVS 16.4 kbps encoder) in multiplexer 602, and outputs the multiplexed bitstream to switching multiplexer 66.

In FIG. 6, for example, scalable encoder 65 receives an input of an PA-channel signal from analyzer/down-mixer/switcher 61, receives an input of the core coding information from core encoder 62 (EVS 13.2 kbps encoder), performs enhanced coding processing in enhanced encoder 606 (enhanced 32 kbps encoder), and outputs enhanced coding information to multiplexer 608. In addition, scalable encoder 65, for example, receives an input of an S-channel signal from analyzer/down-mixer/switcher 61, performs coding processing in monaural encoder 607 (EVS 16.4 kbps encoder), and outputs the coding result of the S-channel signal to multiplexer 608. For example, scalable encoder 65 multiplexes the core coding information outputted from core encoder 62 (EVS 13.2 kbps encoder), the enhanced coding information outputted from enhanced encoder 606 (enhanced 32 kbps encoder), and the S-channel signal coding information outputted from monaural encoder 607 (EVS 16.4 kbps encoder) in multiplexer 608, and outputs the multiplexed bitstream to switching multiplexer 66.

In FIG. 6, switching multiplexer 66, for example, refers to the switching information inputted from analyzer/down-mixer/switcher 61, multiplexes the switching information and any of the multiplexed results (bitstreams), which are the multiplexed result of scalable encoder 65, the multiplexed result of first simulcast encoder 63, and the multiplexed result of second simulcast encoder 64, and outputs the multiplexed switching information and multiplexed result to the transmission path or the storage medium as the final coding result of the hybrid encoder.

Figure 8:
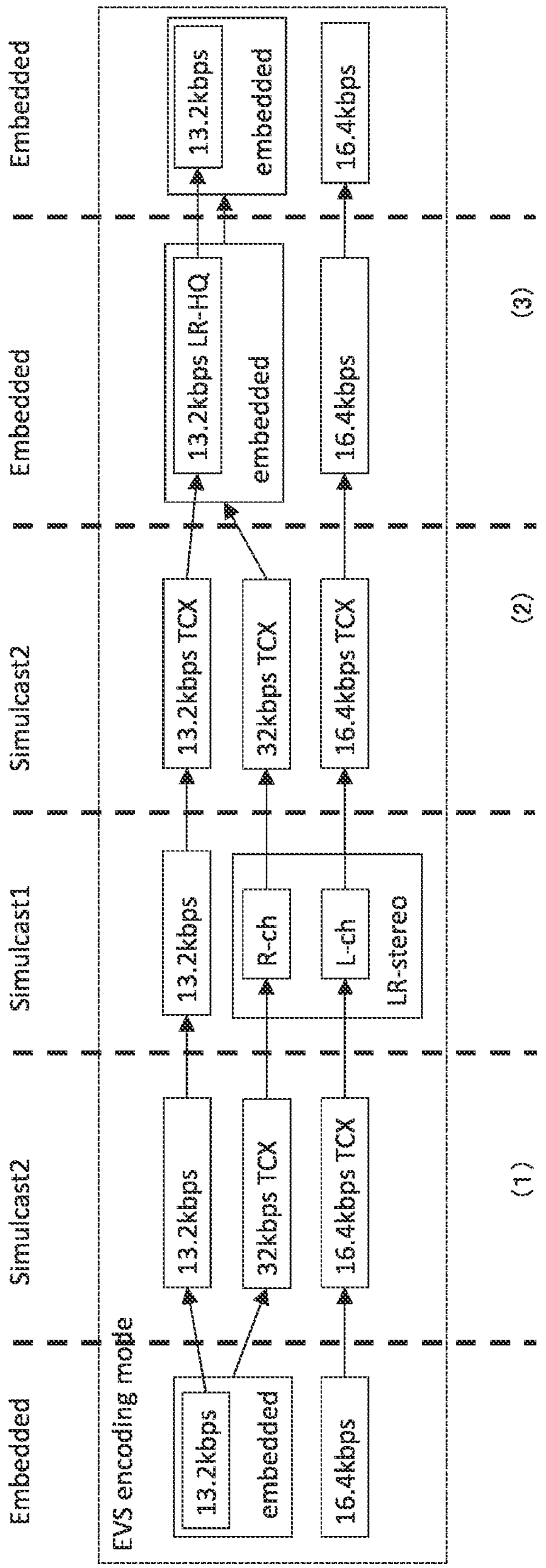
FIG. 8 illustrates embedded/simulcast switching transition and EVS coding mode transition in the hybrid coding system.

FIG. 8 is an exemplary transition diagram with a transition of the EVS coding mode added to the switching transition between first simulcast encoder 63 and scalable encoder 65 illustrated in FIG. 7.

For example, there may be portions where the coding mode is configured (e.g., limited) in the following three frames.

(1) The coding mode for EVS 32 kbps and EVS 16.4 kbps in Simulcast 2 (second simulcast coding) in the MS->LR transition period may be configured to be transform coding (e.g., MDCT coding such as TCX coding mode).

(2) The coding mode for EVS 112 kbps, EVS 32 kbps and EVS 16.4 kbps in Simulcast 2 (second simulcast coding) in the LR->MS transition period may be configured to be transform coding (e.g., MDCT coding such as TCX coding mode).

(3) The coding mode for EVS 13.2 kbps in Embedded (scalable coding) subsequent to (2) may be configured to transform coding (e.g., MDCT coding such as LR-HQ coding mode).

The configuration of the transform coding in EVS 32 kbps and EVS 16.4 kbps in (1) and (2) is, for example, based on the assumption that LR stereo encoder 601 adopts the transform coding. For example, regarding (1), the same type of coding mode may be configured in the MS->LR transition period in order to facilitate smooth connection with LR stereo coding in the frame following the MS->LR transition period. Likewise, for example, regarding (2), the same type of coding mode may be configured in the LR->MS transition period in order to facilitate smooth connection with LR stereo coding in the frame immediately before the LR->MS transition period.

That is, second simulcast encoder 64 may perform monaural coding in the MS->LR transition period and the LR->MS transition period based on the coding mode in LR stereo coding. For example, when the coding mode of LR stereo coding in first simulcast encoder 63 is a coding mode in the frequency domain such as transform coding, second simulcast encoder 64 may perform monaural coding using the coding mode in the frequency domain in the MS->LR transition period and the LR->MS transition period.

In addition, regarding EVS 13.2 kbps in (2) and (3), to enable seamless connection from EVS 32 kbps in Simulcast 2 to EVS 13.2 kbps embedded, the coding mode of EVS 13.2 kbps may be matched with the coding mode of EVS 32 kbps in a frame in the LR->MS transition period in (2), and the coding mode of EVS 13.2 kbps in a frame in (3) may be matched as well. For example, in EVS, two types of coding modes are mainly used: a CELP mode and an MDCT coding mode. For example, in order to connect frames with different bit rates, using the MDCT coding mode prevents a complicated configuration compared to using the CELP mode. Further, in order to realize seamless connection in the MDCT coding mode, overlap-add may be appropriately performed in two consecutive frames as the MDCT coding mode.

An exemplary configuration of hybrid coding system 60 has been described, thus far.

<Exemplary Variation of Hybrid Decoding System>

Figure 9:
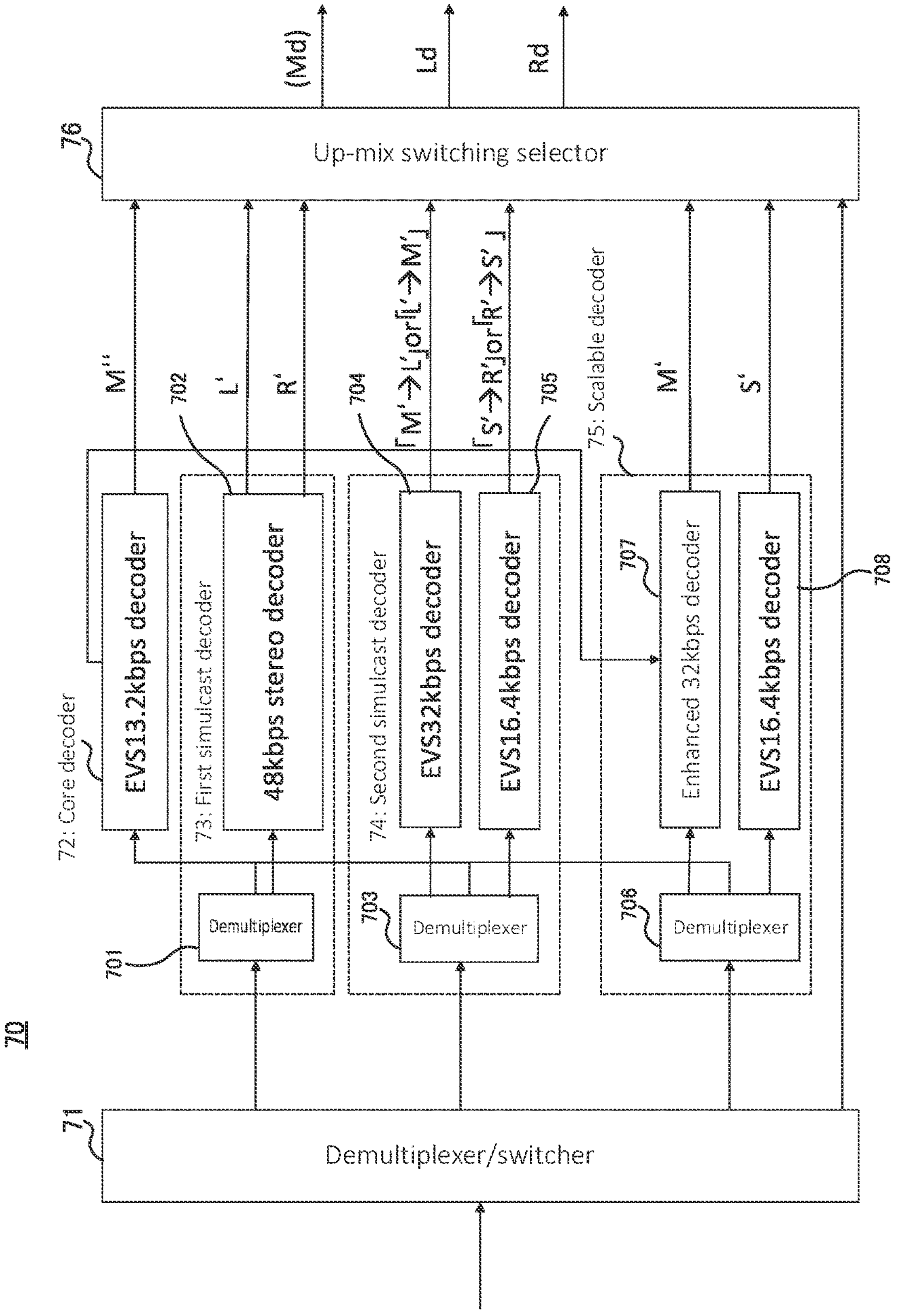
FIG. 9 illustrates an exemplary configuration of a hybrid decoding system.

FIG. 9 illustrates an exemplary configuration of the hybrid decoding system according to an embodiment of the present disclosure.

In FIG. 9, hybrid decoding system 70 may include, for example, demultiplexer/switcher 71, core decoder 72 (EVS 13.2 kbps decoder), first simulcast decoder 73, second simulcast decoder 74, scalable decoder 75, and up-mix switching selector 76.

In hybrid decoding system 70, for example, first simulcast decoder 73 may correspond to first decoding circuitry that decodes coding information of an LR stereo signal (e.g., first stereo signal), and second simulcast decoder 74 may correspond to second decoding circuitry that respectively decodes two-channel signals (second stereo signals) obtained by mixing processing between an L-channel signal and an R-channel signal. In addition, up-mix switching selector 76 may correspond to, for example, up-mix circuitry that switches mixing processing (channel transformation processing, matrix transformation processing, and matrixing) based on information on switching of a stereo signal (e.g., switching information), and up-mixes either one of a decoding result of the first stereo signed and a decoding result of the second stereo signal.

First simulcast decoder 73 may include, for example, demultiplexer 701 and LR stereo decoder 702 (48 kbps stereo decoder). Second simulcast decoder 74 may include, for example, demultiplexer 703 and two monaural decoders 704 and 705 (EVS 32 kbps decoder and EVS 16.4 kbps decoder). Scalable decoder 75 may include, for example, demultiplexer 706, enhanced decoder 707 (enhanced 32 kbps decoder), and monaural decoder 708 (EVS 16.4 kbps decoder).

In FIG. 9, demultiplexer/switcher 71 may, for example, receive an input of the multiplexed information (bitstream) outputted from switching multiplexer 66 via the transmission path or the storage medium, and demultiplex the switching information and the other multiplexed information. For example, demultiplexer/switcher 71 outputs the other multiplexed information to any of first simulcast decoder 73, second simulcast decoder 74, and scalable decoder 75 based on the switching information.

In FIG. 9, for example, first simulcast decoder 73 receives an input of the multiplexed information outputted from demultiplexer/switcher 71, demultiplexes the multiplexed information into core coding information and stereo coding information in demultiplexer 701, outputs the core coding information to core decoder 72 (EVS 13.2 kbps decoder), and outputs the stereo coding information to LR stereo decoder 702 (48 kbps stereo decoder). For example, core decoder 72 (EVS 13.2 kbps decoder) decodes the core coding information outputted from demultiplexer 701 and outputs monaural decoded signal M" to up-mix switching selector 76. In addition, LR stereo decoder 702 decodes the stereo coding information and outputs decoded L-channel signal L' and decoded R-channel signal R' to up-mix switching selector 76.

In FIG. 9, for example, second simulcast decoder 74 receives an input of the multiplexed information outputted from demultiplexer/switcher 71, demultiplexes the multiplexed information into core coding information and two monaural coding information portions in demultiplexer 703, outputs the core coding information to core decoder 72 (EVS 13.2 kbps decoder), and outputs the two monaural coding information portions to two monaural decoders 704 and 705 (EVS 32 kbps decoder and EVS 16.4 kbps decoder). For example, core decoder 72 (EVS 13.2 kbps decoder) decodes the core coding information outputted from demultiplexer 703 and outputs monaural decoded signal M" to up-mix switching selector 76. In addition, two monaural decoders 704 and 705 decode the two monaural coding information portions, and outputs decoded M-L transition signal "M'->L" (or L-M transition signal "L'->M'") and decoded S-R transition signal "S'->R"' (or R-S transition signal "R'->S"') to up-mix switching selector 76.

In FIG. 9, scalable decoder 75 receives an input of the multiplexed information outputted from demultiplexer/switcher 71, demultiplexes the multiplexed information into core coding information, enhanced coding information, and monaural coding information in demultiplexer 706, and outputs the core coding information to core decoder 72 (EVS 13.2 kbps), the enhanced coding information to enhanced decoder 707 (enhanced 32 kbps decoder), and the monaural coding information to monaural decoder 708 (EVS 16.4 kbps decoder). For example, core decoder 72 (EVS 13.2 kbps decoder) decodes the core coding information outputted from demultiplexer 706, outputs decoding information to be used for decoding the enhanced coding information to enhanced decoder 707, and outputs monaural decoded signal M" to up-mix switching selector 76. Further, enhanced decoder 707 performs decoding using, for example, the enhanced coding information outputted from demultiplexer 706 and the core decoding information outputted from core decoder 72, and outputs decoded M-channel signal M' to up-mix switching selector 76. Monaural decoder 708 (EVS 16.4 kbps decoder) decodes the monaural coding information and outputs decoded S-channel signal S' to up-mix switching selector 76.

In FIG. 9, up-mix switching selector 76 outputs, based on the switching information inputted from demultiplexer/switcher 71, for example, any one of M' and S' outputted from scalable decoder 75, L' and M' outputted from first simulcast decoder 73, and M'->L' (or L'->M') and S'->R' (or R'->S') outputted from second simulcast decoder 74 as decoded stereo signals Ld and Rd. Note that up-mix switching selector 76 may output M" outputted from core decoder 72 as decoded monaural signal Md, for example.

Up-mix switching selector 76 may switch between the following four types of up-mix (channel transformation) processing, for example, based on the switching information.

For example, when scalable decoder 75 is selected (case of transformation from M' and S' signals into Ld and Rd signals), the transformation processing is represented by the following Expression 5.

[7]

$$\begin{pmatrix} L_n \\ R_n \end{pmatrix} = U\begin{pmatrix} X_n \\ Y_n \end{pmatrix}, \quad U = \begin{pmatrix} 1 & -1 \\ 1 & 1 \end{pmatrix} \qquad \text{(Expression 5)}$$

In Expression 5, channel signal $X_n$ may represent, for example, an M' signal, and channel signal $Y_n$ may represent, for example, an S' signal.

For example, when second simulcast decoder 74 is selected and the M'->L' signal and the S'->R' signal are transformed into the Ld signal and the Rd signal, the transformation processing is represented by the following Expression 6.

[8]

$$\begin{pmatrix} L_n \\ R_n \end{pmatrix} = \frac{1}{1+\alpha^2}U\begin{pmatrix} X_n \\ Y_n \end{pmatrix}, \quad U = \begin{pmatrix} 1+\alpha_n & -1+\alpha_n \\ 1-\alpha_n & 1+\alpha_n \end{pmatrix}, \quad \alpha_n = \frac{n}{N}, n = 0, \ldots, N-1 \qquad \text{(Expression 6)}$$

In Expression 6, channel signal $X_n$, may represent, for example, M'-L' transition signal "M'->L"', and channel signal $Y_n$ may represent, for example, S'-R' transition signal "S'->R"'.

For example, when first simulcast decoder 73 is selected, the transformation processing is represented by the following Expression 7. The transformation in Expression 7 is non-transformation.

[9]

$$\begin{pmatrix} L_n \\ R_n \end{pmatrix} = U\begin{pmatrix} X_n \\ Y_n \end{pmatrix}, \qquad \text{(Expression 7)}$$

-continued $$U = \begin{pmatrix} 1 & 0 \\ 0 & 1 \end{pmatrix}$$

In Expression 7, channel signal $X_n$ may represent, for example, an L' signal, and channel signal $Y_n$ may represent, for example, an R' signal.

For example, when second simulcast decoder 74 is selected and the L'->M' signal and the R'->S' signal are transformed into the Ld signal and the Rd signal, the transformation processing is represented by the following Expression 8.

[10]

$$\begin{pmatrix} L_n \\ R_n \end{pmatrix} = \frac{1}{1-\alpha+0.5\alpha^2} U \begin{pmatrix} X_n \\ Y_n \end{pmatrix}, \quad \text{(Expression 8)}$$

$$U = \begin{pmatrix} 1-\frac{1}{2}\alpha_n & -\frac{1}{2}\alpha_n \\ \frac{1}{2}\alpha_n & 1-\frac{1}{2}\alpha_n \end{pmatrix},$$

$$\alpha_n = \frac{n}{N}, n = 0, \ldots, N-1$$

In Expression 8, channel signal $X_n$ may represent, for example, L'-M' transition signal "L'->M'", and channel signal $Y_n$ may represent, for example, R'-S' transition signal "R'->S'".

As described above, up-mix switching selector 76 up-mixes a decoding result of a stereo signal (e.g., transition signal) mono-coded based on a coding mode (e.g., transform coding) applied to an LR stereo signal in simulcast coding in the MS->LR transition period or the LR->MS transition period.

An exemplary configuration of the hybrid decoding system has been described, thus far.

FIG. 10 summarizes the switching of down mixing and up-mixing, the configuration of the EVS codec coding mode, and the switching of Embedded/Simulcast 1/Simulcast 2, in the present disclosure. FIG. 10 corresponds to, for example, FIG. 7 and FIG. 8.

As illustrated in FIG. 10, in the present embodiment, the coding (Simulcast 2) based on a coding mode (e.g., transform coding) in simulcast coding is performed in a transition period of switching between scalable coding (Embedded) and simulcast coding (Simulcast 1). This reduces discontinuity caused by switching between scalable coding and simulcast coding, thereby improving coding performance in hybrid coding.

A hybrid coding system in which scalable coding (embedded coding) and simulcast coding are switched between the two has been described, thus far.

Note that a non-limiting embodiment of the present disclosure is not limited to be applied to a hybrid coding system, and may be applied to another coding system. In the following, a description will be given of a case where a non-limiting embodiment of the present disclosure is applied to an MS/LR stereo coding system, by way of example. In the MS/LR stereo coding system, for example, scalable coding (embedded coding) and LR stereo coding may be switched between the two.

<Exemplary Configuration of MS/LR Stereo Coding System>

Figure 11:
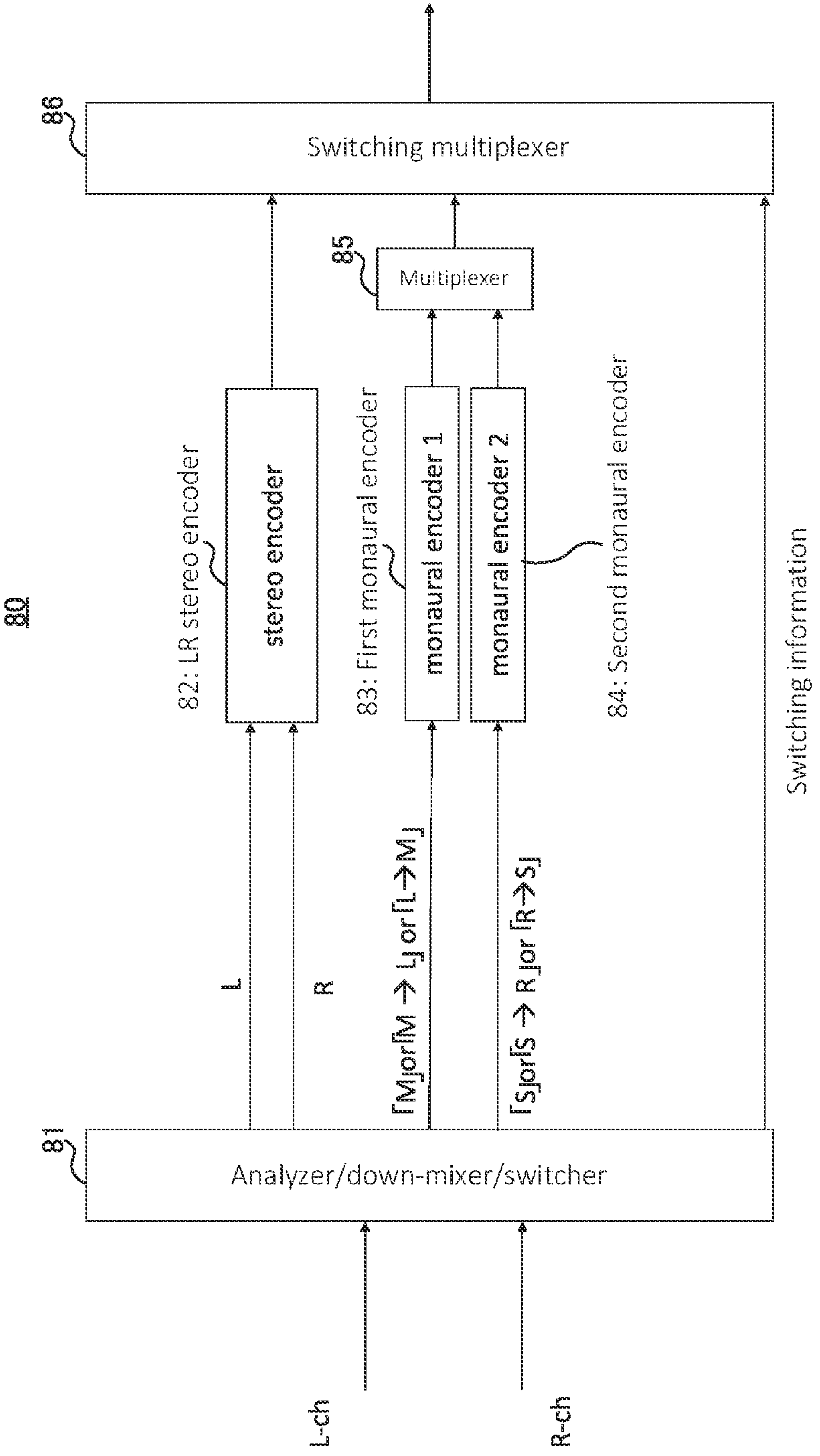
FIG. 11 illustrates an exemplary configuration of an MS/LR stereo coding system.

FIG. 11 illustrates an exemplary configuration of an MS/LR stereo coding system according to an embodiment of the present disclosure.

MS/LR stereo coding system 80 illustrated in FIG. 11 includes analyzer/down-mixer/switcher 81 (e.g., including down-mix circuitry), LR stereo encoder 82 (e.g., 48 kbps stereo encoder), first monaural encoder 83 (e.g., EVS 32 kbps encoder), second monaural encoder 84 (e.g., EVS 16.4 kbps encoder), multiplexer 85, and switching multiplexer 86.

For example, in MS/LR stereo coding system 80, LR stereo encoder 82 and first and second monaural encoders 83 and 84 may be switched between them. For example, LR stereo encoder 82 may correspond to first coding circuitry that performs coding on an LR stereo signal, and first monaural encoder 83 and second monaural encoder 84 may correspond to second coding circuitry that encodes each of two-channel signals obtained by mixing processing (channel transformation processing, matrix transformation processing, and matrixing) between the L-channel signal and the R-channel signal.

Analyzer/down-mixer/switcher 81 receives, for example, an input of a stereo signal (e.g., L-channel (left channel) signal and R-channel (right channel) signal), performs analysis based on channel correlation, and performs down-mix processing on the two channels based on the analysis result. For example, analyzer/down-mixer/switcher 81 may perform, on the stereo signal, down-mix processing (channel transformation processing) determined based on the analysis result, and output the stereo signal after the down-mix processing to any of LR stereo encoder 82 and first and second monaural encoders 83 and 84. In other words, analyzer/down-mixer/switcher 81 may, for example, switch the output destination of the stereo signal subjected to appropriate channel transformation processing based on the analysis result between LR stereo encoder 82 and first and second monaural encoders 83 and 84.

Further, analyzer/down-mixer/switcher 81 may output, to switching multiplexer 86, switching information indicating, for example, the down-mix method and the output destination of the stereo signal.

In the analysis based on channel correlation, analyzer/down-mixer/switcher 81 may, for example, calculate the cross-correlation between the L-channel signal and the R-channel signal to determine whether the maximum cross-correlation exceeds a threshold, or may determine whether the magnitude or energy of the cross-spectrum between the L-channel and the R-channel exceeds a threshold. To enhance the stability between frames, a process of smoothing the analysis results in analyzer/down-mixer/switcher 81 between frames, a hangover process, and a process that produces similar effects to those may be included in the analysis.

For example, in the analysis based on channel correlation, when a value related to the channel correlation (e.g., the maximum value, or the magnitude or energy of the cross spectrum) exceeds a threshold, the inter-channel correlation is high and coding performance tends to be high in the MS stereo coding scheme, and thus, the MS stereo coding scheme according to an embodiment of the present disclosure may be applied. For example, when a value related to the channel correlation exceeds a threshold, analyzer/down-mixer/switcher 81 may switch the output destination of the stereo signal subjected to the channel transformation processing described below to first and second monaural encoders 83 and 84.

Here, the channel transformation processing (don-mix processing) is represented by, for example, the following Expression 9.

[11]

$$\begin{pmatrix} X_n \\ Y_n \end{pmatrix} = D\begin{pmatrix} L_n \\ R_n \end{pmatrix}, \quad D = \begin{pmatrix} 0.5 & 0.5 \\ -0.5 & 0.5 \end{pmatrix} \qquad \text{(Expression 9)}$$

In Expression 9, $L_n$ and $R_n$ respectively represent an L-channel signal and an R-channel signal before the transformation processing, and the subscript n represents time (sample number). In Expression 9, $X_n$ and $Y_n$ respectively represent an M-channel signal (may also be represented as $M_n$ for example) and an S-channel signal (may also be represented as $S_n$, for example) after the transformation processing.

For example, in the analysis based on channel correlation, for example, when a value related to the channel correlation is equal to or less than the threshold, the inter-channel correlation is low and it is difficult to achieve high coding performance in the MS stereo coding scheme, and thus, the MS stereo coding scheme according to an embodiment of the present disclosure need not be applied. In this case, for example, an LR stereo coding scheme that also takes into account coding of a stereo signal with low inter-channel correlation may be applied. For example, when a value related to the channel correlation is equal to or less than a threshold, analyzer/down-mixer/switcher 81 may switch the output destination of the stereo signal subjected to the channel transformation processing described below to LR stereo encoder 82.

Here, the channel transformation processing (down-mix processing) is represented by, for example, the following Expression 10.

[12]

$$\begin{pmatrix} X_n \\ Y_n \end{pmatrix} = D\begin{pmatrix} L_n \\ R_n \end{pmatrix}, \quad D = \begin{pmatrix} 1 & 0 \\ 0 & 1 \end{pmatrix} \qquad \text{(Expression 10)}$$

In the transformation processing of Expression 10, the L-channel signal is configured to be the transformed channel signal $X_n$ (=$L_n$) as it is, and the R-channel signal is configured to be the transformed channel signal $Y_n$ (=$R_n$) as it is.

As described above, analyzer/down-mixer/switcher 81 may switch the mixing processing in accordance with a characteristic (e.g., channel correlation) of an input stereo signal, and generate either a stereo signal including an L-channel signal and an R-channel signal (e.g., LR stereo signal obtained by Expression 10) or a stereo signal obtained by mixing processing of an L-channel signal and an R-channel signal (e.g., MS stereo signal obtained by Expression 9). For example, analyzer/down-mixer/switcher 81 may generate the LR stereo signal when a correlation value between the L-channel signal and the R-channel signal included in the input stereo signal is equal to or less than a threshold, and may generate the MS stereo signal when the correlation value exceeds the threshold.

It is assumed that the transformation matrix is expressed as follows.

$$\begin{pmatrix} a & b \\ c & d \end{pmatrix} \qquad [13]$$

When the transformation processing of Expression 9 is gradually changed to the transformation processing of Expression 10, a changes from 0.5 to 1, b changes from 0.5 to 0, c changes from −0.5 to 0, and d changes from 0.5 to 1. In this case, it is guaranteed that ad−bc≠0 (since 0.25≤a×d≤1 and −0.25≤×c≤0), so that the transformation matrix is regular and an inverse matrix (transformation matrix for up-mixing) exists. That is, there is an inverse transform (corresponding to up-mix transform, for example, transformation processing represented by Expressions 14 and 16) corresponding to intermediate transformation processing (e.g., transformation processing represented by Expressions 11 and 12) between Expressions 9 and 10, and thus the transformation processing can be gradually changed. Meanwhile, it is assumed that the transformation matrix of Expression 9 is expressed as follows, that is, the difference signal is defined as (L-channel signal—R-channel signal).

$$\begin{pmatrix} 0.5 & 0.5 \\ 0.5 & -0.5 \end{pmatrix} \qquad [14]$$

When the transformation processing is gradually changed in the same manner, a changes from 0.5 to 1, b changes from 0.5 to 0, c changes from 0.5 to 0, and d changes from −0.5 to 1. In this case, 0≤b×c≤0.25 while −0.25≤a×d≤1, and a point appears where ad−bc=0 (the transformation matrix is not regular). There is no inverse matrix at such a point, and forcing to obtain an inverse matrix would result in calculating 1/0, which leads to huge values for the elements of the transformation matrix. That is, there is no inverse transform corresponding to such transformation processing, and it is thus impossible to gradually change the transformation processing on the up-mix side. As described above, defining the transformation processing to an MS stereo signal as in Expression 9 guarantees the regularity of the intermediate transformation matrix for the transformation processing between Expressions 9 and 10, and allows for continuous changes in the transformation processing.

Incidentally, when the MS stereo encoders (first and second monaural encoders 83 and 84) and LR stereo encoder 82 in the present disclosure are switched between them, there may be discontinuity between frames at the time of switching that is caused by switching between an LR stereo signal and an MS stereo signal. To resolve this discontinuity, for example, it is preferable to provide a period in which an MS stereo signal gradually changes to an LR stereo signal (e.g., "MS->LR transition period") when the switching destination of the stereo signal is switched from the MS stereo encoders (first and second monaural encoder 83 and 84) to LR stereo encoder 82. Likewise, it is preferable to provide a period in which an LR stereo signal gradually changes to an MS stereo signal (e.g., "LR->MS transition period") when the switching destination of the stereo signal is switched from LR stereo encoder 82 to the MS stereo encoders (first and second monaural encoder 83 and 84).

The channel transformation processing in the MS->LR transition period may be represented by, for example, the following Expression 11.

[15]

$$\begin{pmatrix} X_n \\ Y_n \end{pmatrix} = D\begin{pmatrix} L_n \\ R_n \end{pmatrix}, \qquad \text{(Expression 11)}$$

-continued $$D=\frac{1}{2}\begin{pmatrix}1+\alpha_n & 1-\alpha_n\\ -1+\alpha_n & 1+\alpha_n\end{pmatrix},$$

$$\alpha_n=\frac{n}{N},\ n=0,\ \ldots\ ,\ N-1$$

Here, N represents the frame length (or transition period length). Transition period length N may be shorter than one frame, for example. In Expression 11, channel signal $X_n$ may represent, for example, M-L transition signal "M->L", and channel signal $Y_n$ may represent, for example, S-R transition signal "S->R".

In addition, the channel transformation processing in the LR->MS transition period may be represented by, for example, the following Expression 12.

[16]

$$\begin{pmatrix}X_n\\ Y_n\end{pmatrix}=D\begin{pmatrix}L_n\\ R_n\end{pmatrix},\qquad \text{(Expression 12)}$$

$$D=\frac{1}{2}\begin{pmatrix}2-\alpha_n & \alpha_n\\ -\alpha_n & 2-\alpha_n\end{pmatrix},$$

$$\alpha_n=\frac{n}{N},\ n=0,\ \ldots\ ,\ N-1$$

Here, N represents the frame length (or transition period length). Transition period length N may be shorter than one frame, for example. In Expression 12, channel signal may represent, for example, L-M transition signal "L->M", and channel signal $Y_n$ may represent, for example, R-S transition signal "R->S".

In the MS->LR transition period and the LR->MS transition period, analyzer/down-mixer/switcher 81 may switch the output destination of the stereo signal subjected to the channel transformation processing to first and second monaural encoders 83 and 84.

For example, when switching the output destination of the stereo signal from the MS stereo encoders (first and second monaural encoders 83 and 84) to LR stereo encoder 82, analyzer/down-mixer/switcher 81 may perform switching control so as to transition the stereo signal from the M signal to the L signal. (and from the S signal to the R signal) with the output destination of the stereo signal kept configured (i.e., connected) to first and second monaural encoders 83 and 84 in the MS->LR transition period (e.g., certain frame), and then to switch the output destination of the stereo signal to LR stereo encoder 82 in the next frame.

Likewise, for example, when switching the output destination of the stereo signal from LR stereo encoder 82 to the MS stereo encoders (first and second monaural encoders 83 and 84), analyzer/down-mixer/switcher 81 may perform switching control so as to transition the stereo signal from the L signal to the M signal (and from the R signal to the S signal) with the output destination of the stereo signal switched to first and second monaural encoders 83 and 84 in the LR->MS transition period (e.g., certain frame), and through the frame, to input the MS stereo signal to first and second monaural encoders 83 and 84 in the next frame.

Figure 12:
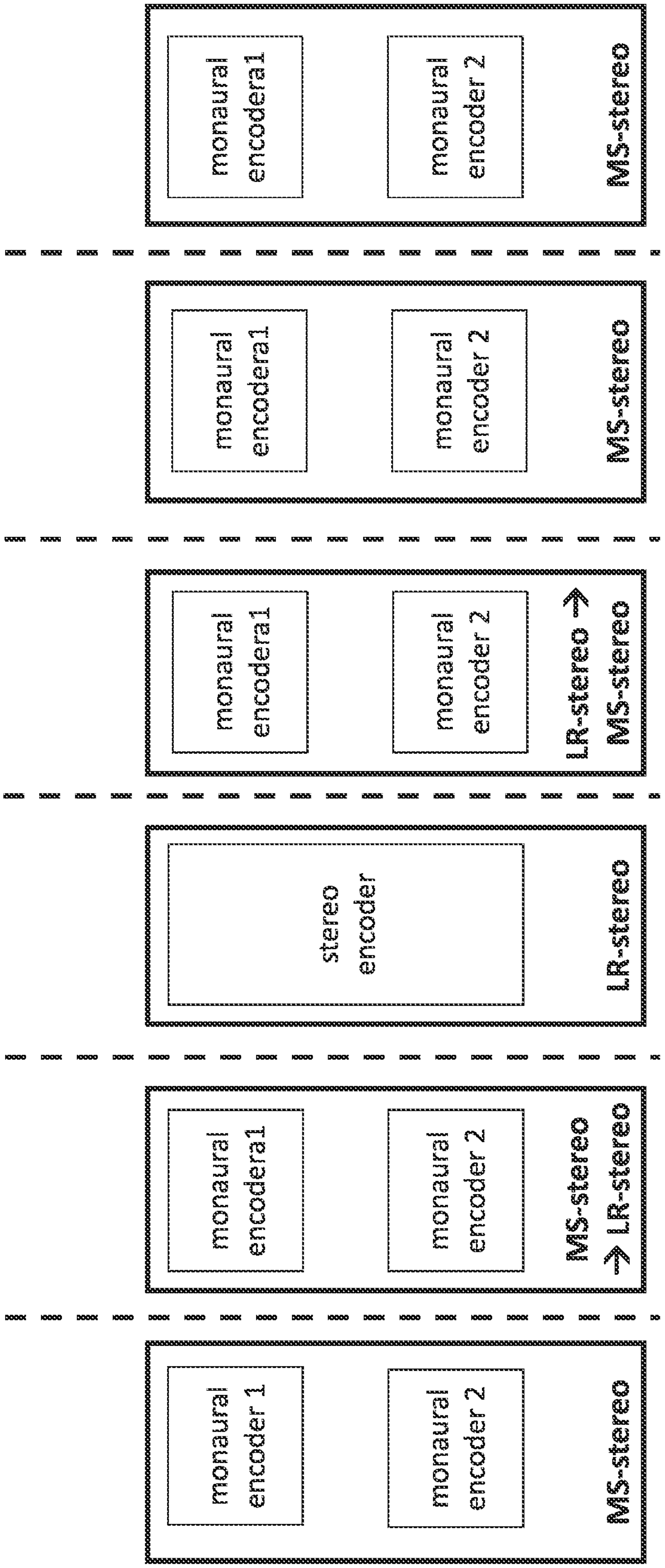
FIG. 12 illustrates MS stereo/LR stereo switching transition in the MS/LR stereo coding system.

FIG. 12 illustrates such switching transition between LR stereo coding and MS stereo coding. FIG. 12 illustrates a state of switching encoders over six frames, by way of example. Time elapses from the left end to the right end of FIG. 12, and frames are separated by broken lines.

In the example illustrated in FIG. 12, the left-end frame (the first frame from the left) is a frame in which the MS stereo encoders (first and second monaural encoders 83 and 84) are selected. The second frame from the left is a frame in which the MS stereo encoders that perform coding in the MS->LR transition period are selected. The third frame from the left is a frame in which LR stereo encoder 82 is selected. The fourth frame from the left is a frame in which the MS stereo encoders that perform coding in the LR->MS transition period are selected. The fifth frame from the left is a frame in which the MS stereo encoders are selected. The sixth frame from the left (the right-end frame) is a frame in which the MS stereo encoders are selected.

The last two frames (the fifth and sixth frames from the left) illustrated in FIG. 12 are both frames in which the MS stereo encoders are selected.

In FIG. 11, for example, LR stereo encoder 82 receives inputs of an L-channel signal and an R-channel signal from analyzer/down-mixer/switcher 81, encodes the signals, and outputs stereo coding information to switching multiplexer 86.

In FIG. 11, for example, first monaural encoder 83 receives, from analyzer/down mixer/switcher 81, an input of an M-channel signal obtained by mono-down-mixing an L-channel signal and an R-channel signal, encodes the M-channel signal, and outputs coding information of the M-channel signal to multiplexer 85.

In FIG. 11, for example, second monaural encoder 84 receives, from analyzer/down-mixer/switcher 81, an input of an S-channel signal obtained by mono-down-mixing an L-channel signal and an R-channel signal, encodes the S-channel signal, and outputs coding information of the S-channel signal to multiplexer 85.

In FIG. 11, multiplexer 85 multiplexes the coding information outputted from first and second monaural encoders 83 and 84, and outputs the multiplexed result (bitstream) to switching multiplexer 86.

In FIG. 11, switching multiplexer 86 refers to the switching information inputted from analyzer/down-mixer/switcher 81, multiplexes the switching information and any of the multiplexed results (bitstreams), which are the multiplexed result of first and second monaural encoders 83 and 84 and the coding result of LR stereo encoder 82, and outputs the multiplexed result to the transmission path or the storage medium.

Figure 13:
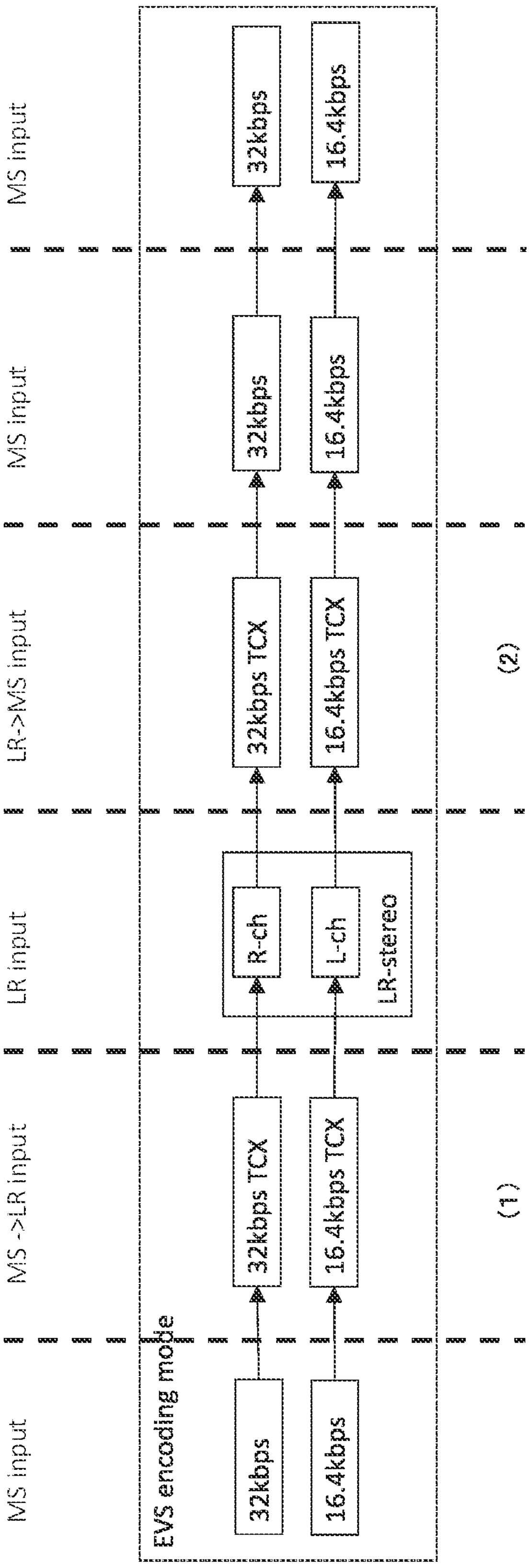
FIG. 13 illustrates MS stereo/LR stereo switching transition and EVS coding mode transition in the MS/LR stereo coding system.

FIG. 13 is an exemplary transition diagram with a transition of the EVS coding mode added to the switching transition between LR stereo encoder 82 and the MS stereo encoders illustrated in FIG. 12 in a case where 32 kbps EVS coding is used for the first monaural coding and 16.4 kbps EVS coding is used for the second monaural coding.

For example, there may be portions where the coding mode is configured. (e.g., limited) in the following two frames.

(1) The EVS coding mode in the MS->LR transition period in first and second monaural encoders 83 and 84 may be configured to be transform coding (e.g., MDCT coding such as TCX coding mode).

(2) The EVS coding mode in the LR->MS transition period in first and second monaural encoders 83 and 84 may be configured to be transform coding (e.g., MDCT coding such as TCX coding mode).

The configuration of the transform coding in first and second monaural encoders 83 and 84 in (1) and (2) is, for example, based on the assumption that LR stereo encoder 82 adopts the transform coding. For example, regarding (1), the same type of coding mode may be configured in the MS->LR transition period in order to facilitate smooth connection with LR stereo coding in the frame following the MS->LR transition period. Likewise, for example, regarding (2), the same type of coding mode may be configured in the LR->MS transition period in order to facilitate smooth connection with R stereo coding in the frame immediately before the LR->MIS transition period.

That is, first and second monaural encoders 83 and 84 may perform monaural coding in the MS->LR transition period and the LR->MS transition period based on the coding mode in LR stereo coding. For example, when the coding mode of LR stereo coding in LR stereo encoder 82 is a coding mode in the frequency domain such as transform coding, first and second monaural encoders 83 and 84 may perform monaural coding using the coding mode in the frequency domain in the MS->LR transition period and the LR->MS transition period.

An exemplary configuration of MS/LR stereo coding system 80 has been described, thus far.

<Exemplary Configuration of LR/MS Stereo Decoding System>

Figure 14:
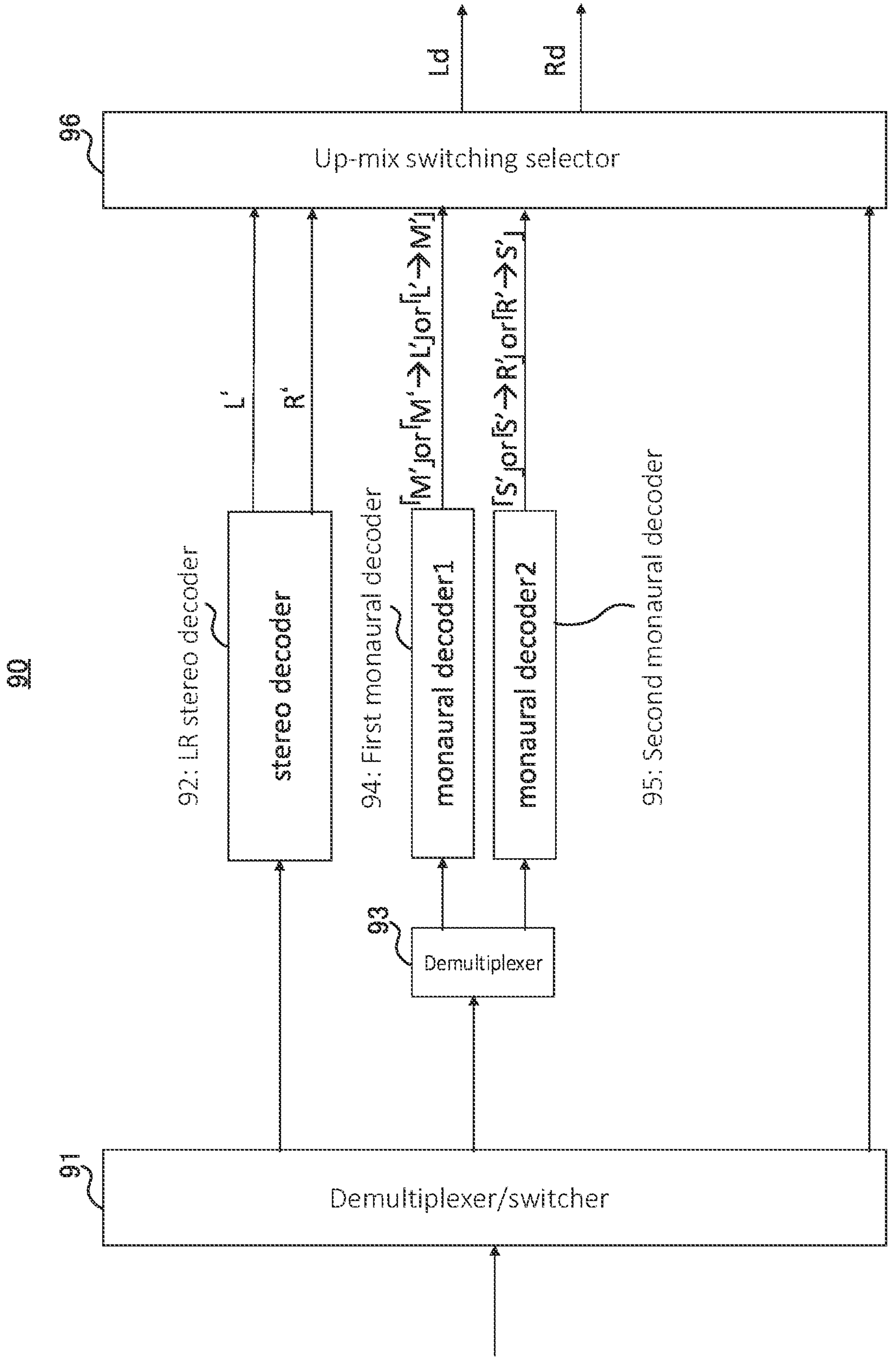
FIG. 14 illustrates an exemplary configuration of an MS/LR stereo decoding system.

FIG. 14 illustrates an exemplary configuration of an LR/MS stereo decoding system according to an embodiment of the present disclosure.

In FIG. 14, LR/MS stereo decoding system 90 includes, for example, demultiplexer/switcher 91, LR stereo decoder 92, demultiplexer 93, first monaural decoder 94, second monaural decoder 95, and up-mix switching selector 96.

In LR/MS stereo decoding system 90, for example, LR stereo decoder 92 may correspond to first decoding circuitry that decodes coding information of an LR stereo signal (e.g., first stereo signal), and first and second monaural decoders 94 and 95 may correspond to second decoding circuitry that respectively decodes two-channel signals obtained by mixing processing (channel transformation processing, matrix transformation processing, and matrixing) between an L-channel signal and an R-channel signal. In addition, up-mix switching selector 96 may correspond to, for example, up-mix circuitry that switches mixing processing based on information on switching of a stereo signal (e.g., switching information), and up-mixes either one of a decoding result of the first stereo signal and a decoding result of the second stereo signal.

In FIG. 14, demultiplexer/switcher 91 may, for example, receive an input of the multiplexed information (bitstream) outputted from switching multiplexer 86 via the transmission path or the storage medium, and demultiplex the switching information and the other multiplexed information. For example, demultiplexer/switcher 91 outputs the other multiplexed information to either LR stereo decoder 92 or demultiplexer 93 based on the switching information.

In FIG. 14, for example, LR stereo decoder 92 decodes the coding information outputted from demultiplexer/switcher 91, and outputs decoded L-channel signal L' and decoded R-channel signal R' to up-mix switching selector 96.

In FIG. 14, demultiplexer 93 demultiplexes the multiplexed information outputted from demultiplexer/switcher 91 into two monaural coding information portions, and outputs the two monaural coding information portions to first monaural decoder 94 and second monaural decoder 95 respectively. First and second monaural decoders 94 and 95 decode the two monaural coding information portions respectively, and output decoded M-L transition signal "M'->L" (or L-M transition signal "L'->M'" or M' signal) and decoded S-R transition signal "S'->R'" (or R-S transition signal "R'->S'" or S' signal) to up-mix switching selector 96.

In FIG. 14, up-mix switching selector 96 performs up-mix processing on any of L' and M' outputted from LR stereo decoder 92, and M'->L' (or L'->M' or M') and S'->R' (or R'->S' or S') outputted from first and second monaural decoders 94 and 95 based on the switching information inputted from demultiplexer/switcher 91, and outputs the result as decoded stereo signals Ld and Md.

Up-mix switching selector 96 may switch between the following four types of up-mix (channel transformation) processing, for example, based on the switching information.

For example, when first and second monaural decoders 94 and 95 are selected and the M' and S' signals are transformed into the Ld and Rd signals, the transformation processing is represented by the following Expression 13.

[17]

$$\begin{pmatrix} L_n \\ R_n \end{pmatrix} = U\begin{pmatrix} X_n \\ Y_n \end{pmatrix}, \quad U = \begin{pmatrix} 1 & -1 \\ 1 & 1 \end{pmatrix} \qquad \text{(Expression 13)}$$

In Expression 13, channel signal may represent, for example, an M' signal, and channel signal $Y_n$ may represent, for example, an S' signal.

For example, when first and second monaural decoders 94 and 95 are selected and the M'->L' signal and S'->R' signal are transformed into the Ld and Rd signals, the transformation processing is represented by the following Expression 14.

[18]

$$\begin{pmatrix} L_n \\ R_n \end{pmatrix} = \frac{1}{1+\alpha^2}U\begin{pmatrix} X_n \\ Y_n \end{pmatrix}, \quad U = \begin{pmatrix} 1+\alpha_n & -1+\alpha_n \\ 1-\alpha_n & 1+\alpha_n \end{pmatrix}, \quad \alpha_n = \frac{n}{N},\ n = 0, \ldots, N-1 \qquad \text{(Expression 14)}$$

In Expression 14, channel signal $X_n$ may represent, for example, M'-L' transition signal "M'->L'", and channel signal may represent, for example, S'-R' transition signal "S'->R'".

For example, when LR stereo decoder 92 is selected, the transformation processing is represented by the following Expression 15. The transformation in Expression 15 is none transformation.

[19]

$$\begin{pmatrix} L_n \\ R_n \end{pmatrix} = U\begin{pmatrix} X_n \\ Y_n \end{pmatrix}, \quad U = \begin{pmatrix} 1 & 0 \\ 0 & 1 \end{pmatrix} \qquad \text{(Expression 15)}$$

In Expression 15, channel signal $X_n$ may represent, for example, an L' signal, and channel signal $Y_n$ may represent, for example, an R' signal.

For example, when first and second monaural decoders 94 and 95 are selected and the L'->M' signal and R'->S' signal are transformed into the Ld and Rd signals, the transformation processing is represented by the following Expression 16.

[20]

$$\begin{pmatrix} L_n \\ R_n \end{pmatrix} = \frac{1}{1-\alpha+0.5\alpha^2} U \begin{pmatrix} X_n \\ Y_n \end{pmatrix}, \qquad \text{(Expression 16)}$$

$$U = \begin{pmatrix} 1-\frac{1}{2}\alpha_n & -\frac{1}{2}\alpha_n \\ \frac{1}{2}\alpha_n & 1-\frac{1}{2}\alpha_n \end{pmatrix},$$

$$\alpha_n = \frac{n}{N},\ n = 0, \ldots, N-1$$

In Expression 16, channel signal $X_n$ may represent, for example, L'-M' transition signal "L'->M'", and channel signal $Y_n$ may represent, for example, R'-S' transition signal "R'->S'".

As described above, up-mix switching selector 96 up-mixes a decoding result of a stereo signal (e.g., transition signal) mono-coded based on a coding mode (e.g., transform coding) applied to an LR stereo signal in LR stereo coding in the MS->LR transition period or the LR->MS transition period.

An exemplary configuration of the LR/MS stereo decoding system has been described, thus far.

FIG. 15 summarizes the switching of down-mixing and up-mixing and the configuration of the EVS codec coding mode in the present disclosure. FIG. 15 corresponds to FIG. 12 and FIG. 13, for example.

As illustrated in FIG. 15, in the present embodiment, coding is performed in the transition periods of switching between MS stereo coding and LR stereo coding based on a coding mode (e.g., transform coding) in LR stereo coding. This reduces discontinuity caused by switching between MS stereo coding and LR stereo coding, thereby improving coding performance in LR/MS stereo coding.

An embodiment of the present disclosure has been described, thus far.

Note that the codec scheme is not limited to the EVS 13.2 kbps codec, EVS 16.4 kbps codec, and 48 kbps stereo codec, and may be another codec scheme.

The time-domain coding mode is not limited to the LP-based coding mode, for example, and may be another coding mode in the time domain. In addition, the frequency-domain coding mode is not limited to, for example, the MDCT-based TCX coding mode and LR-HQ mode, and may be another coding mode in the frequency domain.

The MS->LR transition period and the LR->MS transition period may be on a frame basis or any other time unit basis.

The coding mode in LR stereo coding is not limited to a frequency-domain coding mode (e.g., transform coding), and may be a time-domain coding mode. In an embodiment of the present disclosure, monaural coding should be performed based on the coding mode in LR stereo coding for scalable coding or MS stereo coding in the MS->LR transition period and the LR->MS transition period.

Further, in hybrid coding, the stereo signal obtained by mixing processing on an L-channel signal (e.g., "L") and an R-channel signal (e.g., "R") is not limited to the MS stereo signal defined by M=L+R and S=−L+R. For example, at least one of the L-channel signal and the R-channel signal may be multiplied by a weighting factor, and the L-channel signal and the R-channel signal after multiplication by the weighting factor may be used to generate the MS stereo signal.

The present disclosure can be realized by software, hardware, or software in cooperation with hardware. Each functional block used in the description of each embodiment described above can be partly or entirely realized by an LSI such as an integrated circuit, and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing. If future integrated circuit technology replaces LSIs as a result of the advancement of semiconductor technology or other derivative technology, the functional blocks could be integrated using the future integrated circuit technology. Biotechnology can also be applied.

The present disclosure can be realized by any kind of apparatus, device or system having a function of communication, which is referred to as a communication apparatus. The communication apparatus may comprise a transceiver and processing/control circuitry. The transceiver may comprise and/or function as a receiver and a transmitter. The transceiver, as the transmitter and receiver, may include an RF (radio frequency) module including amplifiers, RF modulators/demodulators and the like, and one or more antennas. Some non-limiting examples of such a communication apparatus include a phone (e.g, cellular (cell) phone, smart phone), a tablet, a personal computer (PC) (e.g, laptop, desktop, netbook), a camera (e.g, digital still/video camera), a digital player (digital audio/video player), a wearable device (e.g, wearable camera, smart watch, tracking device), a game console, a digital book reader, a telehealth/telemedicine (remote health and medicine) device, and a vehicle providing communication functionality (e.g., automotive, airplane, ship), and various combinations thereof.

The communication apparatus is not limited to be portable or movable, and may also include any kind of apparatus, device or system being non-portable or stationary, such as a smart home device (e.g, an appliance, lighting, smart meter, control panel), a vending machine, and any other "things" in a network of an "Internet of Things (IoT)".

The communication may include exchanging data through, for example, a cellular system, a wireless LAN system, a satellite system, etc., and various combinations thereof.

The communication apparatus may comprise a device such as a controller or a sensor which is coupled to a communication device performing a function of communication described in the present disclosure. For example, the communication apparatus may comprise a controller or a sensor that generates control signals or data signals which are used by a communication device performing a communication function of the communication apparatus.

The communication apparatus also may include an infrastructure facility, such as a base station, an access point, and any other apparatus, device or system that communicates with or controls apparatuses such as those in the above non-limiting examples.

An encoder according to an embodiment of the present disclosure includes: down-mix circuitry, which, in operation, switches mixing processing in accordance with a characteristic of an input stereo signal and generates either one of a first stereo signal including a left-channel signal and a right-channel signal and/or a second stereo signal resulting from the mixing processing of the left-cha el signal and the right-channel signal; first coding circuitry, which, in operation, performs stereo-coding on the first stereo signal; and second coding circuitry, which, in operation, performs monaural-coding on each of two signals included in the second stereo signal, wherein, the second coding circuitry performs the monaural-coding based on a coding mode in the first coding circuitry in at least one of a first period in which the first stereo signal is switched to the second stereo signal and/or a second period in which the second stereo signal is switched to the first stereo signal.

In an embodiment of the present disclosure, the coding mode in the first coding circuitry is a frequency-domain coding mode, and the second coding circuitry performs the monaural-coding using the frequency-domain coding mode in at least one of the first period and/or the second period.

In an embodiment of the present disclosure, the coding mode in at least one of the first period and/or the second period is transform coding.

In an embodiment of the present disclosure, the second stereo signal includes a sum signal and a difference signal, the sum signal indicating a sum of the left-channel signal and the right-channel signal, the difference signal indicating a difference between the left-channel signal and the right-channel signal.

In an embodiment of the present disclosure, the difference signal is determined by subtracting the left-channel signal from the right-channel signal.

In an embodiment of the present disclosure, the down-mix circuits generates, using a first signal $L_n$ and a second signal. $R_n$ both included in the input stereo signal, the second stereo signal including a third signal $X_n$ and a fourth signal $Y_n$, following Expression 9.

In an embodiment of the present disclosure, the down-mix circuitry generates, using a first signal $L_n$ and a second signal $R_n$ both included in the input stereo signal, the first stereo signal including the left-channel signal $X_n$ and the right-channel signal $Y_n$, following Expression 10.

In an embodiment of the present disclosure, the down-mix circuitry generates, using a first signal $L_n$ and a second signal $R_n$ both included in the input stereo signal, the first stereo signal including a third signal $X_n$ and a fourth signal $Y_n$ in the second period, following Expression 11.

In an embodiment of the present disclosure, the down-mix circuitry generates, using a first signal $L_n$ and a second signal $R_n$ both included in the input stereo signal, the second stereo signal including a third signal $X_n$ and a fourth signal $Y_n$ in the first period, following Expression 12.

In an embodiment of the present disclosure, the down-mix circuitry generates the first stereo signal when a correlation value between a first signal and a second signal both included in the input stereo signal is equal to or lower than a threshold, and generates the second stereo signal when the correlation value exceeds the threshold.

In an embodiment of the present disclosure, the first coding circuitry performs left-right (LR) stereo coding using the left-channel signal and the right-channel signal, and the second coding circuitry performs scalable coding.

In an embodiment of the present disclosure, the first coding circuitry performs left-right (LR) stereo coding using the left-channel signal and the right-channel signal and simulcast coding including coding of a monaural signal resulting from the left-channel signal and the right-channel signal, and the second coding circuitry performs scalable coding.

A decoder according to an embodiment of the present disclosure includes: first decoding circuitry, which, in operation, decodes coding information of a first stereo signal including a left-channel signal and a right-channel signal; second decoding circuitry, which, in operation, decodes coding information of a second stereo signal resulting from mixing processing of the left-channel signal and the right-channel signal; and up-mix circuitry, which, in operation, switches the mixing processing based on information on switching of a stereo signal and up-mixes either one of a decoding result of the first stereo signal and/or a decoding result of the second stereo signal, wherein, the up-mix circuitry up-mixes the decoding result of the second stereo signal that is monaural-coded based on a coding mode applied to the first stereo signal in at least one of a first period in which the first stereo signal is switched to the second stereo signal and/or a second period in which the second stereo signal is switched to the first stereo signal.

An encoding method according to an embodiment of the present disclosure includes: switching, by an encoder, mixing processing in accordance with a characteristic of an input stereo signal and generating, by the encoder, either one of a first stereo signal including a left-channel signal and a right-channel signal and/or a second stereo signal resulting from the mixing processing of the left-channel signal and the right-channel signal; performing, by the encoder, stereo-coding on the first stereo signal; performing, by the encoder, monaural-coding on each of two signals included in the second stereo signal; and performing, by the encoder, the monaural-coding based on a coding mode in coding of the first stereo signal in at least one of a first period in which the first stereo signal is switched to the second stereo signal and/or a second period in which the second stereo signal is switched to the first stereo signal.

A decoding method according to an embodiment of the present disclosure includes: decoding, by a decoder, coding information of a first stereo signal including a left-channel signal and a right-channel signal; decoding, by the decoder, coding information of a second stereo signal resulting from mixing processing of the left-channel signal and the right-channel signal; switching, by the decoder, the mixing processing based on information on switching of a stereo signal and up-mixing, by the decoder, either one of a decoding result of the first stereo signal and/or a decoding result of the second stereo signal; and up-mixing, by the decoder, the decoding result of the second stereo signal that is monaural-coded based on a coding mode applied to the first stereo signal in at least one of a first period in which the first stereo signal is switched to the second stereo signal and/or a second period in which the second stereo signal is switched to the first stereo signal.

The disclosures of U.S. Provisional Application No. 63/149,933, filed on Feb. 16, 2021, and Japanese Patent Application No. 2021-139976, filed on Aug. 30, 2021, each including the specification, drawings, and abstracts, are incorporated herein by reference in their entirety.

INDUSTRIAL APPLICABILITY

An exemplary embodiment of the present disclosure is useful for coding systems, etc.

REFERENCE SIGNS LIST

1 MS stereo coding/decoding system
11, 15, 401 Adder

12, 16 Subtractor
13 EVS 13.2 kbps embedded encoder/decoder
14 EVS 16.4 kbps encoder/decoder
20 Coding system
21 EVS 13.2 kbps embedded encoder
22 EVS 16.4 kbps encoder
23, 404, 602, 605, 608, 85 Multiplexer
30 Decoding system
31, 501, 701, 703, 706, 93 Demultiplexer
32 EVS 13.2 kbps embedded decoder
33 EVS 16.4 kbps decoder
40, 60 Hybrid coding system
41 Analyzer/switcher
42, 65 Scalable encoder
43 Simulcast encoder
44, 66, 86 Switching multiplexer
50, 70 Hybrid decoding system
51, 71, 91 Demultiplexer/switcher
52, 75 Scalable decoder
53 Simulcast decoder
54 Switching selector
61, 81 Analyzer/down-mixer/switcher
62 Core encoder
63 First simulcast encoder
64 Second simulcast encoder
72 Core decoder
73 First simulcast decoder
74 Second simulcast decoder
76, 96 Up-mix switching selector
80 MS/LR stereo coding system
82 LR stereo encoder
83 First monaural encoder
84 Second monaural encoder
90 LR/MS stereo decoding system
92 LR stereo decoder
94 First monaural decoder
95 Second monaural decoder
402 EV S encoder
403 Stereo encoder
502 EVS encoder
503 Stereo decoder
601 LR stereo encoder
603, 604, 607 Monaural encoder
606 Enhanced encoder
702 LR stereo decoder
704, 705, 708 Monaural decoder
707 Enhanced decoder

The invention claimed is:

1. An encoder, comprising:

down-mix circuitry, which, in operation, switches mixing processing in accordance with a characteristic of an input stereo signal and generates either one of a first stereo signal including a left-channel signal and a right-channel signal and/or a second stereo signal resulting from the mixing processing of the left-channel signal and the right-channel signal;

first coding circuitry, which, in operation, performs stereo-coding on the first stereo signal; and second coding circuitry, which, in operation, performs monaural-coding on each of two signals included in the second stereo signal, wherein, the second coding circuitry performs the monaural-coding based on a coding mode in the first coding circuitry in at least one of a first period in which the first stereo signal is switched to the second stereo signal and/or a second period in which the second stereo signal is switched to the first stereo signal.

2. The encoder according to claim 1, wherein, the coding mode in the first coding circuitry is a frequency-domain coding mode, and the second coding circuitry performs the monaural-coding using the frequency-domain coding mode in at least one of the first period and/or the second period.

3. The encoder according to claim 1, wherein the coding mode in at east one of the first period and/or the second period is transform coding.

4. The encoder according to claim 1, wherein the second stereo signal includes a sum signal and a difference signal, the sum signal indicating a sum of the left-channel signal and the right-channel signal, the difference signal indicating a difference between the left-channel signal and the right-channel signal.

5. The encoder according to claim 4, wherein the difference signal is determined by subtracting the left-channel signal from the right-channel signal.

6. The encoder according to claim 1, wherein the down-mix circuitry generates, using a first signal $L_n$ and a second signal $R_n$ both included in the input stereo signal, the second stereo signal including a third signal $X_n$ and a fourth signal $Y_n$, following Expression 1:

[1]

$$\begin{pmatrix} X_n \\ Y_n \end{pmatrix} = D\begin{pmatrix} L_n \\ R_n \end{pmatrix}, \quad D = \begin{pmatrix} 0.5 & 0.5 \\ -0.5 & 0.5 \end{pmatrix}, \qquad \text{(Expression 1)}$$

where n represents a sample number.

7. The encoder according to claim 1, wherein the down-mix circuitry generates, using a first signal $L_n$ and a second signal $R_n$ both included in the input stereo signal, the first stereo signal including the left-channel signal $X_n$ and the right-chapel signal $Y_n$, following Expression 2:

[2]

$$\begin{pmatrix} X_n \\ Y_n \end{pmatrix} = D\begin{pmatrix} L_n \\ R_n \end{pmatrix}, \quad D = \begin{pmatrix} 1 & 0 \\ 0 & 1 \end{pmatrix}, \qquad \text{(Expression 2)}$$

where n represents a sample number.

8. The encoder according to claim 1, wherein the down-mix circuitry generates, using a first signal $L_n$ and a second signal $R_n$ both included in the input stereo signal, the first stereo signal including a third signal $X_n$ and a fourth signal $Y_n$ in the second period, following Expression 3:

[3]

$$\begin{pmatrix} X_n \\ Y_n \end{pmatrix} = D\begin{pmatrix} L_n \\ R_n \end{pmatrix}, \quad D = \frac{1}{2}\begin{pmatrix} 1+\alpha_n & 1-\alpha_n \\ -1+\alpha_n & 1+\alpha_n \end{pmatrix}, \quad \alpha_n = \frac{n}{N},\ n = 0, \ldots, N-1, \qquad \text{(Expression 3)}$$

where N represents a length of the second period, and n represents a sample number.

9. The encoder according to claim 1, wherein the down-circuitry generates, using a first signal $L_n$ and a second signal $R_n$ both included in the input stereo signal, the second stereo signal including a third signal $X_n$ and a fourth signal $Y_n$ in the first period, following Expression 4:

[4]

$$\begin{pmatrix} X_n \\ Y_n \end{pmatrix} = D\begin{pmatrix} L_n \\ R_n \end{pmatrix}, \quad \text{(Expression 4)}$$

$$D = \frac{1}{2}\begin{pmatrix} 2-\alpha_n & \alpha_n \\ -\alpha_n & 2-\alpha_n \end{pmatrix},$$

$$\alpha_n = \frac{n}{N}, n = 0, \ldots, N-1,$$

where N represents a length of the first period, n represents a sample number.

10. The encoder according to claim 1, wherein the down-mix circuitry generates the first stereo signal when a correlation value between a first signal and a second signal both included in the input stereo signal is equal to or lower than a threshold, and generates the second stereo signal when the correlation value exceeds the threshold.

11. The encoder according to claim 1, wherein the first coding circuitry performs left-right (LR) stereo coding using the left-channel signal and the right-channel signal, and the second coding circuitry performs scalable coding.

12. The encoder according to claim 1, wherein the first coding circuitry performs left-right (LR) stereo coding using the left-channel signal and the right-channel signal and simulcast coding including coding of a monaural signal resulting from the left-channel signal and the right-channel signal, and the second coding circuitry performs scalable coding.

13. A decoder, comprising:

first decoding circuitry, which, in operation, decodes coding information of a first stereo signal including a left-channel signal and a right-channel signal;

second decoding circuitry, which, in operation, decodes coding information of a second stereo signal resulting from mixing processing of the left-channel signal and the right-channel signal; and up-mix circuitry, which, in operation, switches the mixing processing based on information on switching of a stereo signal and up-mixes either one of a decoding result of the first stereo signal and/or a decoding result of the second stereo signal, wherein, the up-mix circuitry up-mixes the decoding result of the second stereo signal that is monaural-coded based on a coding mode applied to the first stereo signal in at least one of a first period in which the first stereo signal is switched to the second stereo signal and/or a second period in which the second stereo signal is switched to the first stereo signal.

14. A coding method, comprising:

switching, by an encoder, mixing processing in accordance with a characteristic of an input stereo signal and generating, by the encoder, either one of a first stereo signal including a left-channel signal and a right-channel signal and/or a second stereo signal resulting from the mixing processing of the left-channel signal and the right-channel signal;

performing, by the encoder, stereo-coding on the first stereo signal;

performing, by the encoder, monaural-coding on each of two signals included in the second stereo signal; and performing, by the encoder, the monaural-coding based on a coding mode in coding of the first stereo signal in at least one of a first period in which the first stereo signal is switched to the second stereo signal and/or a second period in which the second stereo signal is switched to the first stereo signal.

15. A decoding method, comprising:

decoding, by a decoder, coding information of a first stereo signal including a left-channel signal and a right-channel signal;

decoding, by the decoder, coding information of a second stereo signal resulting from mixing processing of the left-channel signal and the right-channel signal;

switching, by the decoder, the mixing processing based on information on switching of a stereo signal and up-mixing, by the decoder, either one of a decoding result of the first stereo signal and/or a decoding result of the second stereo signal; and up-mixing, by the decoder, the decoding result of the second stereo signal that is monaural-coded based on a coding mode applied to the first stereo signal in at least one of a first period in Which the first stereo signal is switched to the second stereo signal and/or a second period in which the second stereo signal is switched to the first stereo signal.

* * * * *